(12) United States Patent
Sato et al.

(10) Patent No.: US 9,556,023 B2
(45) Date of Patent: Jan. 31, 2017

(54) POROUS COMPOSITE METAL OXIDE, CATALYST USING THE SAME, AND METHODS FOR PRODUCING THE POROUS COMPOSITE METAL OXIDE AND THE CATALYST

(75) Inventors: Kimitoshi Sato, Inazawa (JP); Kae Yamamura, Nagoya (JP); Akira Morikawa, Nagoya (JP); Akihiko Suda, Seto (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 796 days.

(21) Appl. No.: 13/390,254

(22) PCT Filed: Sep. 10, 2010

(86) PCT No.: PCT/JP2010/065665
§ 371 (c)(1),
(2), (4) Date: Feb. 13, 2012

(87) PCT Pub. No.: WO2011/030875
PCT Pub. Date: Mar. 17, 2011

(65) Prior Publication Data
US 2012/0142523 A1 Jun. 7, 2012

(30) Foreign Application Priority Data

Sep. 11, 2009 (JP) .................................. 2009-211141
Jan. 14, 2010 (JP) .................................. 2010-005698

(51) Int. Cl.
*B01J 21/00* (2006.01)
*B01J 23/00* (2006.01)
(Continued)

(52) U.S. Cl.
CPC .............. *B82Y 30/00* (2013.01); *B01J 23/002* (2013.01); *B01J 23/10* (2013.01); *B01J 23/63* (2013.01);
(Continued)

(58) Field of Classification Search
USPC ................ 502/345–346, 355, 349, 331–332, 100,502/300
See application file for complete search history.

(56) References Cited

U.S. PATENT DOCUMENTS 6,046,128 A * 4/2000 Kisen ....................... B01J 29/40
423/239.2
6,391,276 B1 5/2002 Suda et al.
(Continued)

FOREIGN PATENT DOCUMENTS

JP   A-2000-327329   11/2000
JP   A-2002-211908   7/2002
(Continued)

OTHER PUBLICATIONS

International Search Report in International Application No. PCT/JP2010/065665; dated Dec. 21, 2010 (with English-language translation).

*Primary Examiner* — James McDonough
(74) *Attorney, Agent, or Firm* — Oliff PLC

(57) ABSTRACT

A porous composite metal oxide, including a mixture of first ultrafine particles containing alumina and second ultrafine particles containing zirconia, wherein the first ultrafine particles and the second ultrafine particles are uniformly dispersed in such a way as to satisfy a condition that standard deviations of content ratios (% by mass) of all metal elements contained in the porous composite metal oxide at 0.1% by mass or more are each 10 or less, the standard deviations being obtained by measuring content ratios of the metal elements at 100 measurement points within a minute (Continued)

analysis region of 20 nm square by energy dispersive X-ray spectroscopy using a scanning transmission electron microscope equipped with a spherical aberration correction function.

19 Claims, 19 Drawing Sheets

(51) Int. Cl.

| | |
|---|---|
| B01J 25/00 | (2006.01) |
| B01J 29/00 | (2006.01) |
| B01J 23/70 | (2006.01) |
| B01J 23/72 | (2006.01) |
| B82Y 30/00 | (2011.01) |
| B01J 23/10 | (2006.01) |
| B01J 23/63 | (2006.01) |
| B01J 23/83 | (2006.01) |
| B01J 35/00 | (2006.01) |
| B01J 35/10 | (2006.01) |
| B01J 37/02 | (2006.01) |
| B01J 37/03 | (2006.01) |
| B01J 37/04 | (2006.01) |
| C01G 25/00 | (2006.01) |
| B01J 21/04 | (2006.01) |
| B01J 21/06 | (2006.01) |

(52) U.S. Cl.
CPC .............. *B01J 23/83* (2013.01); *B01J 35/002* (2013.01); *B01J 35/006* (2013.01); *B01J 35/0013* (2013.01); *B01J 35/1014* (2013.01); *B01J 35/1038* (2013.01); *B01J 35/1061* (2013.01); *B01J 37/0201* (2013.01); *B01J 37/031* (2013.01); *B01J 37/04* (2013.01); *C01G 25/00* (2013.01); B01J 21/04 (2013.01); B01J 21/063 (2013.01); B01J 21/066 (2013.01); B01J 2523/00 (2013.01); C01P 2004/03 (2013.01); C01P 2004/64 (2013.01); C01P 2004/82 (2013.01); C01P 2006/12 (2013.01); C01P 2006/14 (2013.01); C01P 2006/16 (2013.01)

(56) References Cited

U.S. PATENT DOCUMENTS

| | | | |
|---|---|---|---|
| 7,214,643 B2* | 5/2007 | Yamamoto | C01G 25/00 423/592.1 |
| 7,935,653 B2* | 5/2011 | Shimazu | B01D 53/945 106/286.1 |
| 2002/0049137 A1 | 4/2002 | Morikawa et al. | |
| 2007/0215009 A1 | 9/2007 | Shimazu et al. | |

FOREIGN PATENT DOCUMENTS

| | | |
|---|---|---|
| JP | A-2002-331238 | 11/2002 |
| JP | A-2007-063057 | 3/2007 |
| JP | A-2008-526660 | 7/2008 |
| WO | WO 2005/121025 A1 | 12/2005 |
| WO | WO 2006/070201 A2 | 7/2006 |
| WO | WO 2009/008392 A1 | 1/2009 |

* cited by examiner

| No. | Al | Ce | Zr | Y | O wt% |
|---|---|---|---|---|---|
| 1 | 4.7 | 24.4 | 29.4 | 10.9 | 30.7 |
| 2 | 8.1 | 29.9 | 22.8 | 0.1 | 39.1 |
| 3 | 33.1 | 0 | 5.3 | 0.1 | 61.5 |
| 4 | 24.5 | 0 | 0 | 0 | 75.5 |
| 5 | 5.9 | 12.6 | 31.9 | 0.2 | 49.4 |
| 6 | 6.4 | 24.3 | 33.5 | 0.1 | 35.7 |
| 7 | 4.8 | 12.7 | 34.7 | 0 | 47.8 |
| 8 | 23.4 | 0 | 0 | 0 | 76.6 |

POROUS COMPOSITE METAL OXIDE, CATALYST USING THE SAME, AND METHODS FOR PRODUCING THE POROUS COMPOSITE METAL OXIDE AND THE CATALYST

TECHNICAL FIELD

The present invention relates to a porous composite metal oxide useful as a catalyst support and the like, a catalyst using the same, and methods for producing the porous composite metal oxide and the catalyst.

BACKGROUND ART

Various catalysts have so far been developed as catalysts for purification of exhaust gas with which noxious substances emitted from an internal combustion engine of an automobile or the like are treated for purification. For example, as a three-way catalyst which oxidizes CO and HC in exhaust gas and simultaneously reduces NOx therein for purification, a catalyst has widely been known in which a noble metal such as platinum or rhodium is supported on a catalyst support made of alumina, silica, zirconia, titania, and the like.

Meanwhile, as a method for producing such a catalyst support made of a composite metal oxide, the so-called coprecipitation method or the so-called hydrothermal synthesis method is generally employed. Specifically, in the coprecipitation method, an alkali is added to a solution containing multiple metal ion species, and thereby a supersaturation state where the ion concentration product in the solution is higher than the solubility product is achieved. As a result, insoluble salts of multiple kinds of metals precipitate and deposit simultaneously. Meanwhile, the hydrothermal synthesis method is a synthesis method conducted in the presence of hot water at high temperature and high pressure.

For example, International Application Japanese-Phase Publication No. 2008-526660 (Patent Literature 1) discloses a method for the formation of a composite hydroxide or oxide as a method for forming a composite hydroxide or oxide containing alumina and zirconia, and optionally containing at least one kind selected from ceria, lanthana, praseodymia, samaria, yttria, and other rare earth oxides. This method for the formation of a composite hydroxide or oxide comprising the steps of: preparing an aqueous metal salt solution consisting of water-soluble salts of metals corresponding to metals in the aforementioned composite oxide; and forming a hydroxide precipitate slurry by combining the aqueous metal salt solution with an aqueous solution of a caustic alkali in a reaction vessel with agitation at a pH greater than 8.5 to precipitate out all the metal species.

Meanwhile, Japanese Unexamined Patent Application Publication No. 2002-211908 (Patent Literature 2), which was applied by the same applicants as those of the present application, discloses a composite oxide powder produced by a method comprising: from an aqueous solution or a water-containing solution in which a cerium compound and a compound of at least one metal selected from Al, Ti and Si are dissolved, allowing the formation of a precipitate of a precursor of cerium oxide and a precursor of an oxide of the at least one metal selected from Al, Ti and Si or a compound of these precursors; aging the precipitate in a suspension state where the aqueous solution or the water-containing solution serves as a dispersant or in a state where water is sufficiently present in a system; and then calcining the precipitate. Patent Literature 2 states that, in such a composite oxide powder, ceria, and the oxide of the at least one metal selected from alumina, titania, and silica are dispersed on the no scale, and that when microanalysis on a non-overlapped single particle is carried out by means of EDS using a FE-STEM with a beam of 5-nm diameter, Ce and the at least one metal selected from Al, Ti, and Si are detected at composition ratios in ±20% of their respective feed composition ratios at 90% or more of analytical points.

However, the composite metal oxide is obtained by the so-called coprecipitation method in the invention described in each of these Patent Literatures. Such a composite metal oxide prepared by the conventional coprecipitation method or the conventional hydrothermal synthesis method has a limitation on improvement in the uniformly of the metal oxide, and a limitation on improvement in heat resistance. Accordingly, a catalyst obtained by using such a composite metal oxide as a support is not necessarily satisfactory because of its limitations on improvement in the catalytic activities and the durability thereof at high temperature.

CITATION LIST

Patent Literature

[Patent Literature 1] International Application Japanese-Phase Publication No. 2008-526660
[Patent Literature 2] Japanese Unexamined Patent Application Publication No. 2002-211908

SUMMARY OF INVENTION

Technical Problem

The present invention has been made in view of the above-described problems of the conventional techniques. Accordingly, an object of the present invention is to provide a porous composite metal oxide containing alumina and zirconia and being excellent in heat resistance. This porous composite metal oxide is useful as a catalyst support with which an ideal catalyst having high levels of catalytic activities and durability thereof at high temperature can be achieved. For the purpose of providing the porous composite metal oxide, another object of the present invention is to provide a method which enables production of a porous composite metal oxide in which ultrafine particles containing alumina and ultrafine particles containing zirconia are uniformly mixed with each other at an extremely high degree of dispersion.

Solution to Problem

The present inventors have devoted themselves to keen studies for achieving the above object. As a result, the present inventors have found the following fact. Specifically, multiple raw material solutions are introduced independently of each other directly to a region with a specific shear rate, and homogeneously mixed with each other. The thus obtained colloidal solution containing aluminum and the thus obtained colloidal solution containing zirconium are mixed with each other under a predetermined pH condition. Then, the pH of the obtained colloidal mixture liquid is adjusted to a predetermined pH condition. The thus obtained aggregates are subjected to a heat treatment. As a result, astonishingly, a porous composite metal oxide can be obtained in which ultrafine particles containing alumina and ultrafine particles containing zirconia are uniformly mixed with each other at an extremely high degree of dispersion. When the porous composite metal oxide is used, an ideal catalyst can be obtained with which catalytic activities and durability thereof at high temperature can be achieved at high levels. Accordingly, the present inventors have completed the present invention.

A porous composite metal oxide of the present invention is a porous composite metal oxide, comprising:

a mixture of first ultrafine particles containing alumina and second ultrafine particles containing zirconia, wherein the first ultrafine particles and the second ultrafine particles are uniformly dispersed in such a way as to satisfy a condition that standard deviations of content ratios (% by mass) of all metal elements contained in the porous composite metal oxide at 0.1% by mass or more are each 10 or less, the standard deviations being obtained by measuring content ratios of the metal elements at 100 measurement points within a minute analysis region of 20 nm square by energy dispersive X-ray spectroscopy using a scanning transmission electron microscope equipped with a spherical aberration correction function.

More preferably, in the porous composite metal oxide of the present invention, the first ultrafine particles and the second ultrafine particles are uniformly dispersed in such a way as to satisfy a condition that standard deviations of content ratios (% by mass) of all metal elements contained in the porous composite metal oxide at 0.1% by mass or more are each 15 or less, the standard deviations being obtained by measuring content ratios of the metal elements at 100 measurement points within a minute analysis region of 10 nm square by energy dispersive X-ray spectroscopy using a scanning transmission electron microscope equipped with a spherical aberration correction function.

In addition, in the porous composite metal oxide of the present invention, the first ultrafine particles and/or the second ultrafine particles further preferably contain at least one metal oxide selected from the group consisting of oxides of rare earth elements and oxides of alkaline earth metals.

Moreover, the porous composite metal oxide of the present invention preferably satisfies the following conditions:
(i) a crystallite diameter determined by an X-ray diffraction method is 1 to 10 nm,
(ii) a specific surface area determined by a BET method is 65 m²/g or more,
(iii) an average pore diameter determined by a nitrogen adsorption method is 20 nm or less, and
(iv) a pore volume determined by a nitrogen adsorption method is 0.3 cm³/g or more.

Meanwhile, a catalyst of the present invention comprises: the porous composite metal oxide of the present invention; and a noble metal supported on a surface of the porous composite metal oxide.

Another catalyst of the present invention may be a catalyst comprising:

the above-described porous composite metal oxide of the present invention; and at least one selected from the group consisting of transition metals, oxides thereof, and mixtures thereof supported on a surface of the porous composite metal oxide, the transition metal being selected from the group consisting of Cu, Fe, Ni, Co, Mn, and Zn.

Still another catalyst of the present invention may be a catalyst comprising:

the above-described porous composite metal oxide of the present invention; and $CuAl_2O_4$ and $CuO$ contained in the first ultrafine particles and/or the second ultrafine particles.

In the porous composite metal oxide of the present invention, ultrafine particles containing alumina and ultrafine particles containing zirconia are uniformly mixed with each other at an extremely high degree of dispersion. Therefore, the porous composite metal oxide of the present invention is unprecedented and novel, and is first obtained by the following production method of the present invention.

The method for producing a porous composite metal oxide of the present invention comprises the steps of:

introducing independently a raw material solution containing aluminum ions and a raw material solution containing at least one polymeric dispersant selected from the group consisting of polyalkyleneimines and (meth)acrylic acid-based polymers directly into a region in which a shear rate is 1000 to 200000 sec$^{-1}$, and homogeneously mixing the raw material solutions, thereby obtaining a first colloidal solution;

introducing independently a raw material solution containing zirconium ions and a raw material solution containing at least one polymeric dispersant selected from the group consisting of polyalkyleneimines and (meth)acrylic acid-based polymers directly into a region in which a shear rate is 1000 to 200000 sec$^{-1}$, and homogeneously mixing the raw material solutions, thereby obtaining a second colloidal solution;

mixing the first colloidal solution and the second colloidal solution with each other under a pH condition under which both the first and second colloidal solutions can maintain a state of being dispersed in a liquid, thereby obtaining a colloidal mixture liquid;

adjusting a pH of the colloidal mixture liquid to a pH condition under which the colloidal mixture liquid cannot maintain a state of being dispersed in the liquid, thereby obtaining an aggregate; and subjecting the aggregate to a heat treatment, thereby obtaining the porous composite metal oxide of the present invention.

In the method for producing a porous composite metal oxide of the present invention, the raw material solution containing aluminum ions and/or the raw material solution containing zirconium ions preferably further contains ions of at least one metal selected from the group consisting of rare earth elements and alkaline earth metals.

In addition, in the method for producing a porous composite metal oxide of the present invention, when each of the polymeric dispersants is the at least one polyalkyleneimine, the pH condition under which both the first and second colloidal solutions can maintain the state of being dispersed in the liquid is preferably 0.5 to 5.5, and the pH condition under which the colloidal mixture liquid cannot maintain the state of being dispersed in the liquid is preferably 9.0 to 12.0.

Meanwhile, when each of the polymeric dispersants is the at least one (meth)acrylic acid-based polymer, the pH condition under which both the first and second colloidal solutions can maintain the state of being dispersed in the liquid is preferably 5.0 to 10.0, and the pH condition under which the colloidal mixture liquid cannot maintain the state of being dispersed in the liquid is preferably 0.5 to 4.0.

Meanwhile, a method for producing a catalyst of the present invention is a method comprising the step of supporting a noble metal on a surface of a porous composite metal oxide obtained by the production method of the present invention.

Another method for producing a catalyst of the present invention may be a method comprising the step of supporting at least one selected from the group consisting of transition metals, oxides thereof, and mixtures thereof on a surface of a porous composite metal oxide obtained by the above-described production method of the present invention, the transition metal being selected from the group consisting of Cu, Fe, Ni, Co, Mn, and Zn.

Still another method for producing a catalyst of the present invention may be a method comprising the step of causing the porous composite metal oxide comprising the mixture of the first ultrafine particles containing alumina and the second ultrafine particles containing zirconia to further contain $CuAl_2O_4$ and CuO as additional components, in the above-described production method of the present invention.

Note that it is not known exactly why the production method of the present invention makes it possible to obtain the porous composite metal oxide of the present invention in which ultrafine particles containing alumina and ultrafine particles containing zirconia are uniformly mixed with each other at an extremely high degree of dispersion. However, the present inventors presume the reason to be as follows. Specifically, nano particles such as crystallites of a metal compound are prone to aggregate in an aqueous solution such as water. In general, the aggregation is suppressed by adding a polymeric dispersant and causing the polymeric dispersant to adsorb onto the nano particles. Presumably, the polymeric dispersant (the polyalkyleneimine or the (meth) acrylic acid-based polymer) used in the present invention also suppresses the aggregation by adsorbing onto the nano particles. However, aggregates having large particle diameters tend to be formed in a case where the polymeric dispersant is simply added, and an ordinary stirring is performed. This is presumably because, since the polymeric dispersant is generally larger than the primary particles, and easily form a cross-linking structure, the nano particles onto which the polymeric dispersant adsorbs aggregate along with the cross-linking reaction of the polymeric dispersant, and the polymeric dispersant adsorbs onto multiple crystallites of the metal compound simultaneously.

Meanwhile, in the production method of the present invention, since the predetermined shearing force is applied to the reaction field in addition to the addition of the polymeric dispersant, the polymeric dispersant adsorbs onto the nano particles simultaneously with the destruction of the aggregation structure of the crystallites of the metal compound. Presumably, for this reason, the nano particles are present in the colloidal solution in the original state or in a state of aggregates having relatively small particle diameters. In addition, the polymeric dispersant is present stably in the colloidal solution, and aggregates having large particle diameters are less likely to be formed. Presumably, for this reason, the nano particles are dispersed stably in the colloidal solution in the original state or in a state of aggregates having relatively small particle diameters.

In addition, in the production method of the present invention, the colloidal solution in which nano particles of the aluminum compound are dispersed stably in the liquid as described above and the colloidal solution in which nano particles of the zirconium compound are dispersed stably in the liquid as described above are mixed with each other under the pH condition under which both of the colloidal solutions can maintain the state of being dispersed in the liquid. For this reason, the nano particles of the aluminum compound and the nano particles of the zirconium compound are uniformly mixed with each other at an extremely high degree of dispersion. Subsequently, when the pH is adjusted to the pH condition under which the state of being dispersed in the liquid of the colloidal mixture liquid is not maintained, aggregates in which such a uniformly mixed state (a highly dispersed state) is maintained can be obtained. The present inventors presume that, for the above-described reason, the porous composite metal oxide of the present invention in which the ultrafine particles containing alumina and the ultrafine particles containing zirconia are uniformly mixed with each other at an extremely high degree of dispersion can be obtained by subjecting the aggregates to a heat treatment.

In addition, it is not known exactly why the ideal catalyst with which catalytic activities and durability thereof at high temperature are achieved at high levels can be obtained by using such a porous composite metal oxide of the present invention as a catalyst support. However, the present inventors presume the reason to be as follows. Specifically, in the porous composite metal oxide of the present invention, the ultrafine particles containing alumina and the ultrafine particles containing zirconia are uniformly mixed with each other at an extremely high degree of dispersion and at the nano level. Accordingly, the ultrafine particles containing alumina functions as a diffusion barrier, and hence particle growth is suppressed even under a high temperature condition. As a result, the large specific surface area is maintained even at high temperature. In addition, since the ultrafine particles are disposed with a small degree of aggregation and in a state where spaces between particles are large, a large pore volume can be achieved, and simultaneously the pore diameter is retained at high temperature, which results in suppression of decrease in gas diffusibility. The present inventors presume that, for this reason, ideal catalytic activities are achieved in a diffusion controlled region and also a high level of the durability thereof at high temperature is also achieved by using such a porous composite metal oxide of the present invention as a catalyst support.

Advantageous Effects of Invention

According to the present invention, it is possible to obtain a porous composite metal oxide in which ultrafine particles containing alumina and ultrafine particles containing zirconia are uniformly mixed with each other at an extremely high degree of dispersion. Hence, according to the present invention, it is possible to provide a porous composite metal oxide containing alumina and zirconia and being excellent in heat resistance. This porous composite metal oxide is useful as a catalyst support with which an ideal catalyst having high levels of catalytic activities and durability thereof at high temperature can be achieved.

DESCRIPTION OF EMBODIMENTS

Figure 1:
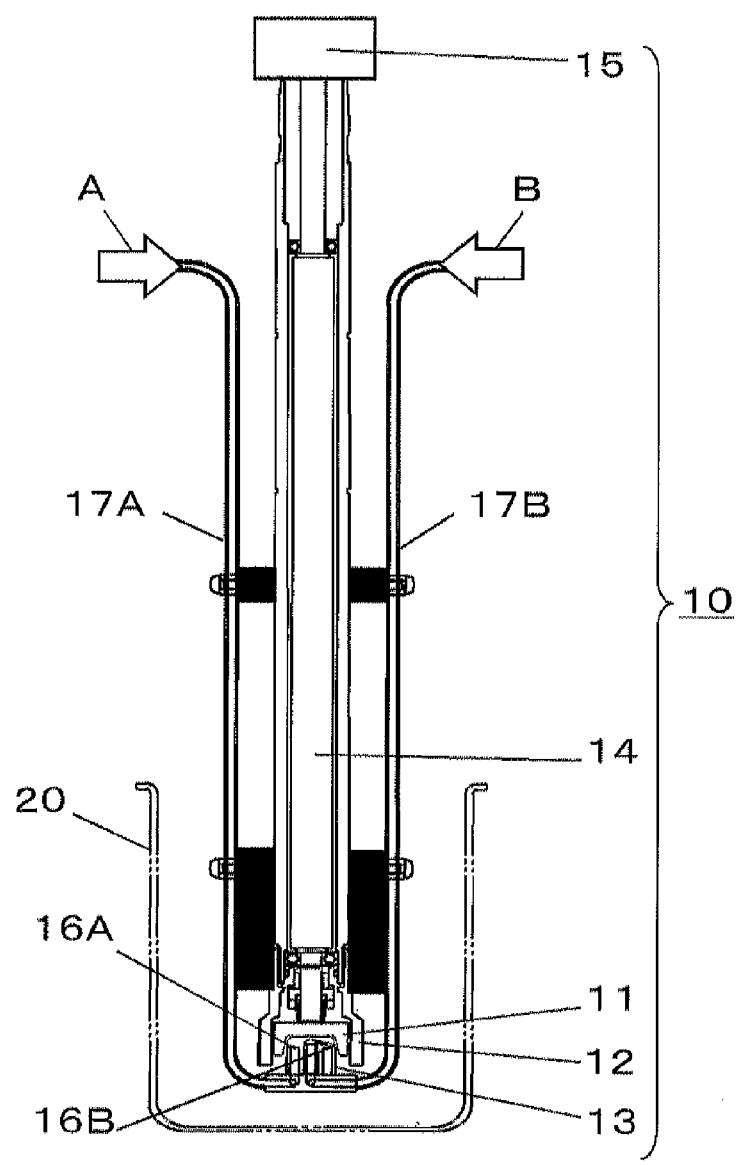
FIG. 1 is a schematic longitudinal section showing a preferred embodiment of a production apparatus for a colloidal solution used in the present invention.

Hereinafter, the present invention will be described in detail on the basis of preferred embodiments thereof.

First, a porous composite metal oxide of the present invention will be described. The porous composite metal oxide of the present invention is a mixture of first ultrafine particles containing alumina and second ultrafine particles containing zirconia. Note that each "ultrafine particle" herein refer to a primary particle of crystallites of a metal oxide or a composite metal oxide, or a independent secondary particle thereof which is not bound to any other secondary particles.

The first ultrafine particles only need to contain alumina ($Al_2O_3$), but may further contain at least one metal oxide selected from the group consisting of oxides of rare earth elements (such as La, Ce, Pr, Y, and Sc) and oxides of alkaline earth metals (such as Sr, Ca, and Ba). When the first ultrafine particles are any one of a composite metal oxide and a metal oxide mixture which contain alumina and other metal oxides, a content ratio of alumina in the first ultrafine particles is preferably 30% by mole or more.

The second ultrafine particles only need to contain zirconia ($ZrO_2$), but may further contain at least one metal oxide selected from the group consisting of oxides of rare earth elements (such as La, Ce, Pr, Y, and Sc) and oxides of alkaline earth metals (such as Sr, Ca, and Ba). Of these, it is preferable to further contain at least one selected from the group consisting of ceria ($CeO_2$), yttria ($Y_2O_3$), and lanthana ($La_2O_3$), and particularly preferable to further contain a $CeO_2$—$ZrO_2$—$Y_2O_3$ ternary composite metal oxide or a $ZrO_2$—$La_2O_3$ binary composite metal oxide, from the viewpoint of having oxygen storage performance and heat resistance. When the second ultrafine particles are any one of a composite metal oxide and a metal oxide mixture which contain zirconia and other metal oxides, a content ratio of zirconia in the second ultrafine particles is preferably 30% by mole or more.

The ratio between the first ultrafine particles and the second ultrafine particles mixed with each other is not particularly limited. However, a volume ratio of alumina to zirconia in an obtained mixture is preferably approximately 30:70 to 70:30. For example, in a case of $Al_2O_3$ and $ZrO_2$, this volume ratio corresponds to 22:78 to 61:39 in terms of mass percentage. If the content ratio of alumina is less than the lower limit, a function of alumina as a diffusion barrier tends to be weak. Meanwhile, if the content ratio of zirconia is less than the lower limit, functions as a zirconium-based composite oxide, such as oxygen storage performance and stable performance of adsorbing a noble metal, tend to be weak.

In the porous composite metal oxide of the present invention, the first ultrafine particles and the second ultrafine particles are dispersed uniformly, and satisfy a condition that standard deviations of content ratios (% by mass) of all metal elements contained in the porous composite metal oxide at 0.1% by mass or more are each 10 or less, the standard deviations being obtained by measuring content ratios of the metal elements at 100 measurement points within a minute analysis region of 20 nm square by energy dispersive X-ray spectroscopy (EDS) using a scanning transmission electron microscope (STEM) equipped with a spherical aberration correction function. Since the first ultrafine particles and the second ultrafine particles are uniformly mixed with each other at an extremely high degree of dispersion as described above, the porous composite metal oxide of the present invention is excellent in heat resistance. Accordingly, the use of such a porous composite metal oxide as a catalyst support makes it possible to obtain a catalyst which achieves high levels of catalytic activities and durability thereof at high temperature.

In addition, the porous composite metal oxide of the present invention more preferably satisfies a condition that standard deviations of content ratios (% by mass) of all metal elements contained in the porous composite metal oxide at 0.1% by mass or more are each 15 or less, the standard deviations being obtained by measuring content ratios of the metal elements at 100 measurement points within a minute analysis region of 10 nm square by EDS using a STEM.

In addition, the porous composite metal oxide of the present invention preferably satisfies at least one of the following conditions and particularly preferably satisfies all of the following conditions:

A crystallite diameter determined by an X-ray diffraction method is 1 to 10 nm,
(ii) A specific surface area determined by a BET method is 65 m$^2$/g or more,
(iii) An average pore diameter determined by a nitrogen adsorption method is 20 nm or less, and
(iv) A pore volume determined by a nitrogen adsorption method is 0.3 cm$^3$/g or more. The crystallite diameter (i) is equal to or larger than a diameter (1 nm) of a crystallite in a colloidal solution. On the other hand, if the crystallite diameter (i) exceeds the above-described limit, functions as a zirconia-containing composite oxide, for example, the oxygen storage performance in a zirconia/ceria system, tend to be low. Meanwhile, if the average pore diameter (iii) exceeds the above-described limit, gas diffusibility tends to be lowered in the case of the use as, for example, a catalyst for purification of exhaust gas. Moreover, if the specific surface area (ii) or the pore volume (iv) is less than the lower limit, gas diffusibility tends to be lowered in the case of the use as, for example, a catalyst for purification of exhaust gas.

Next, a catalyst of the present invention will be described. The catalyst of the present invention comprises: the porous composite metal oxide of the present invention; and a noble metal supported on a surface of the porous composite metal oxide. Examples of such a noble metal include platinum, rhodium, palladium, osmium, iridium, gold, and the like. Anyone of platinum, rhodium, and palladium is preferable from the viewpoint that the obtained catalyst becomes useful as a catalyst for purification of exhaust gas or the like. In addition, the amount of such a noble metal supported is not particularly limited, and is adjusted as appropriate in accordance with the application and the like of the catalyst to be obtained. Generally, the amount is approximately 0.1 to 10 parts by mass relative to 100 parts by mass of the porous composite metal oxide (excluding the noble metal).

Alternatively, another catalyst of the present invention may be a catalyst comprising:
the above-described porous composite metal oxide of the present invention; and
at least one transition metal, an oxide thereof, or a mixture thereof, supported on a surface of the porous composite metal oxide, the transition metal being selected from the group consisting of Cu, Fe, Ni, Co, Mn, and Zn. Cu, CuO, or CuAl$_2$O$_4$ are particularly preferable as the active species, from the viewpoint that the obtained catalyst becomes useful as a catalyst for purification of exhaust gas or the like. In addition, the amount of the active species supported is not particularly limited, and is adjusted as appropriate in accordance with the application and the like of the catalyst to be obtained. Generally, the amount is approximately 0.1 to 10 parts by mass relative to 100 parts by mass of the porous composite metal oxide (excluding the active species).

Moreover, still another catalyst of the present invention may be a catalyst comprising:
the porous composite metal oxide comprising the mixture of the first ultrafine particles containing alumina and the second ultrafine particles containing zirconia, the porous composite metal oxide further containing CuAl$_2$O$_4$ and CuO, which show excellent catalytic activities, as additional components. In addition, the amount of the additional components is not particularly limited, and is adjusted as appropriate in accordance with the application and the like of the catalyst to be obtained. Generally, the amount is approximately 0.1 to 10 parts by mass relative to 100 parts by mass of the porous composite metal oxide (excluding the additional components).

The form of the catalyst of the present invention is not particularly limited, and, for example, the catalyst in the form of particles may be used as it is; alternatively, the catalyst may be used in the form of a monolithic catalyst having a honeycomb shape in which the catalyst is supported on a substrate, a pellet catalyst obtained by shaping the catalyst into a pellet shape, or the like. The substrate used herein is also not particularly limited, and a particulate filter substrate (a DPF substrate), a monolithic substrate, a pellet-shaped substrate, a plate-shaped substrate, or the like can preferably be employed. In addition, a material of such a substrate is not particularly limited, and a substrate made of a ceramic such as cordierite, silicon carbide, aluminum titanate, or mullite, or a substrate made of a metal such as stainless steel containing chromium and aluminum can preferably be employed. Moreover, various other components usable for a catalyst may be supported as appropriate in the catalyst of the present invention (for example, a NOx storage material or the like in a case of a catalyst for purification of exhaust gas) as long as the effects of the present invention is not impaired.

Next, a method for producing a porous composite metal oxide of the present invention will be described. Specifically, the method for producing a porous composite metal oxide of the present invention comprises the steps of:

introducing independently a raw material solution (a raw material solution A-1) containing aluminum ions and a raw material solution (a raw material solution B-1) containing at least one polymeric dispersant selected from the group consisting of polyalkyleneimines and (meth)acrylic acid-based polymers directly into a region in which a shear rate is 1000 to 200000 sec$^{-1}$, and homogeneously mixing the raw material solutions, thereby obtaining a first colloidal solution (a first colloidal solution producing step);

introducing independently a raw material solution (a raw material solution A-2) containing zirconium ions and a raw material solution (a raw material solution B-2) containing at least one polymeric dispersant selected from the group consisting of polyalkyleneimines and (meth)acrylic acid-based polymers directly into a region in which a shear rate is 1000 to 200000 sec$^{-1}$, and homogeneously mixing the raw material solutions, thereby obtaining a second colloidal solution (a second colloidal solution producing step);

mixing the first colloidal solution and the second colloidal solution with each other under a pH condition under which both the first and second colloidal solutions can maintain a state of being dispersed in a liquid, thereby obtaining a colloidal mixture liquid (a colloidal solution mixing step);

adjusting a pH of the colloidal mixture liquid to a pH condition under which the colloidal mixture liquid cannot maintain a state of being dispersed in the liquid, thereby obtaining an aggregate (an aggregation step); and subjecting the aggregate to a heat treatment, thereby obtaining the porous composite metal oxide of the present invention (a heat treatment step).

(First and Second Colloidal Solution Producing Steps)

The raw material solution (the raw material solution A-1) containing aluminum ions is obtainable by dissolving an aluminum compound and, in accordance with an intended composition of the first ultrafine particles, other metal compounds in a solvent. Meanwhile, the raw material solution (the raw material solution A-2) containing zirconium ions is obtainable by dissolving a zirconium compound and other metal compounds in a solvent in accordance with an intended composition of the second ultrafine particles.

As such an aluminum compound, a zirconium compound, and other metal compounds, salts (acetates, nitrates, chlorides, sulfates, sulfites, inorganic complex salts, or the like) of these metals are suitably used. Of these, acetates or nitrates are particularly preferable from the viewpoints that no corrosive solution such as HCl is produced as a by-product, and that no sulfur is contained which may serve as a component degrading the performance in a case of the use as a support of a catalyst for purification of exhaust gas.

In addition, each of the raw material solutions (the raw material solution B-1 and the raw material solution B-2) containing the polymeric dispersants is obtainable by dissolving a polyalkyleneimine or a (meth)acrylic acid-based polymer, and, as necessary, an ammonium salt (ammonium acetate, ammonium nitrate, or the like), ammonia water, an acid (acetic acid, nitric acid, or the like), an aqueous solution of hydrogen peroxide, or the like in a solvent.

Examples of the solvents used in the present invention include water, water-soluble organic solvents (such as methanol, ethanol, propanol, isopropanol, butanol, acetone, acetonitrile, and the like), mixture solvents of water with any of the water-soluble organic solvents, and the like.

In the first colloidal solution producing step, the raw material solution A-1 and the raw material solution B-1 are introduced independently of each other directly to a region in which a shear rate is 1000 to 200000 $sec^{-1}$, and homogeneously mixed with each other. Meanwhile, in the second colloidal solution producing step, the raw material solution A-2 and the raw material solution B-2 are introduced independently of each other directly to a region with the above-described shear rate, and homogeneously mixed with each other. By performing homogeneous mixing as described above, even in a solvent such as water in which crystallites of a metal compound are prone to aggregate, the crystallites of the metal compounds can be dispersed in the liquid in their original state or in a state of uniform aggregates having smaller diameters.

An example of an apparatus used for such mixing methods is shown in FIG. 1. Hereinafter, the apparatus suitable for the present invention will be described in detail with reference to drawings. Note that, in the following description and drawings, the same or corresponding components are denoted by the same reference numerals, and overlapping description will be omitted.

Figure 2:
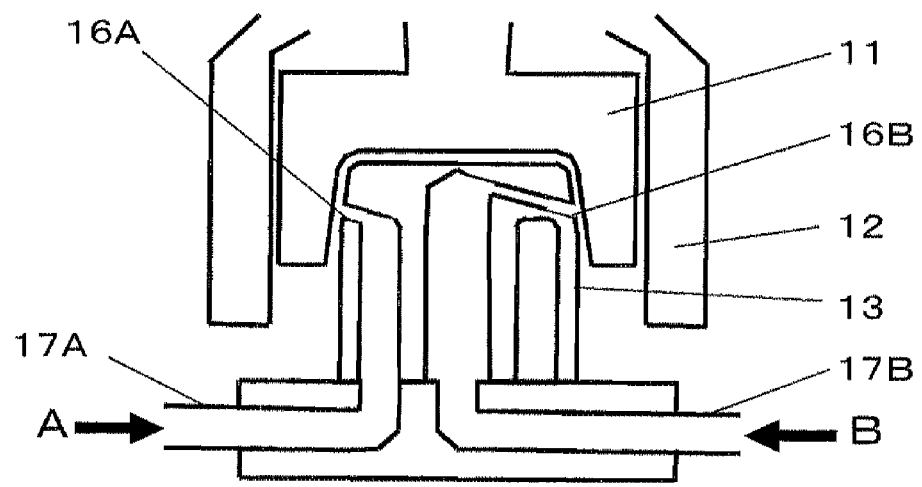
FIG. 2 is an enlarged longitudinal section showing an end portion (a stirring portion) of a homogenizer 10 shown in FIG. 1.

The production apparatus shown in FIG. 1 includes a homogenizer 10 as a stirrer. An end portion (a stirring portion) of the homogenizer 10 is located in a reaction vessel 20. As shown in FIG. 2, the end portion of the homogenizer 10 includes a concave rotor 11, a concave outer stator 12, and a convex inner stator 13. The outer stator 12 is disposed in such a way that a region with a predetermined gap is formed between the stator 12 and an outer periphery of the rotor 11. The inner stator 13 is disposed in such a way that a region with a predetermined gap is formed between the inner stator 13 and an inner periphery of the rotor 11. In addition, the rotor 11 is connected to a motor 15 via a rotary shaft 14, so that a structure which allows rotation is formed.

In addition, in the production apparatus shown in FIG. 1, multiple nozzles, i.e., nozzles 16A for introducing the raw material solution A and nozzles 16B for introducing the raw material solution B are provided. Each of the nozzles 16A and 16B is provided on a surface, of the inner stator 13, facing to the rotor 11. In addition, to the nozzles 16A, a feeder (not illustrated) for the raw material solution A is connected via a flow path 17A. To the nozzles 16B, a feeder (not illustrated) for the raw material solution B is connected via a flow path 17B. Thus, a structure is formed with which the raw material solution A and the raw material solution B can be introduced independently of each other directly to the region between the rotor 11 and the inner stator 13.

Figure 3:
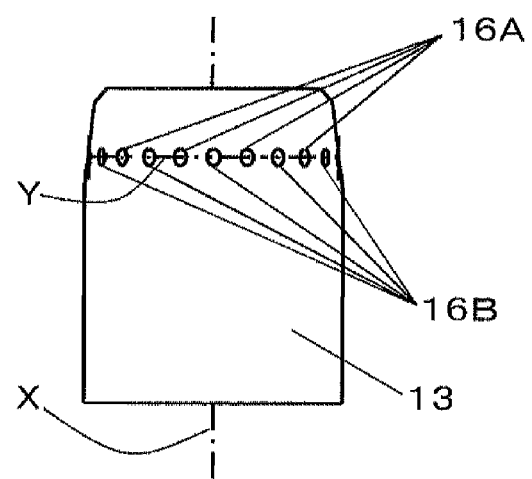
FIG. 3 is a side view of an inner stator 13 shown in FIG. 1.
Figure 4:
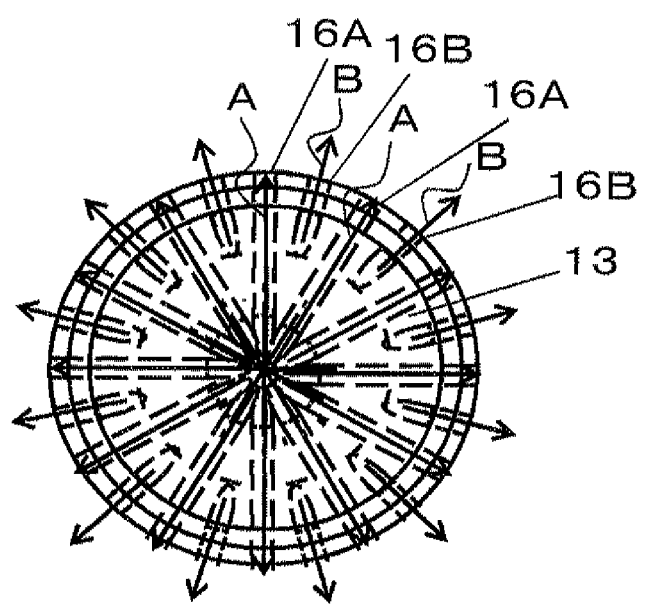
FIG. 4 is a transverse section of the inner stator 13 shown in FIG. 1.

In addition, in the production apparatus shown in FIG. 1, nozzles 16A and nozzles 16B are alternately arranged on the surface, of the inner stator 13, facing to the rotor 11 in an outer circumferential direction on a predetermined surface Y perpendicular to an axis X of rotation of the rotor 11 as shown in FIGS. 3 and 4.

Note that, in FIGS. 3 and 4, the numbers of the nozzles 16A and the nozzle 16B provided are each 12 (24-hole-type). However, the numbers of the nozzles 16A and the nozzles 16B are not particularly limited. Accordingly, it is only necessary to provide one nozzle 16A and one nozzle 16B (two-hole-type). However, from the viewpoint that the time from the introduction of the raw material solution A and the raw material solution B into the region to the completion of the homogeneous mixing can be shortened, the numbers of the nozzles 16A and the nozzles 16B are each preferably 10 or more, and more preferably 20 or more. Meanwhile, an upper limitation of each of the number of the nozzles 16A and the number of the nozzles 16B is not particularly limited, and varies depending on the size of the apparatus. However, from the viewpoint that clogging of the nozzles is more surely prevented, the numbers are preferably set so that the diameter of an opening portion of each of the nozzles 16A and the nozzles 16B which are arranged alternately can have a dimension of approximately 0.1 mm or more. The diameter of the opening portion of each nozzle is not particularly limited as described above, and varies depending on the size of the apparatus. However, the diameter is preferably approximately 0.1 to 1 mm from the viewpoint that clogging of the nozzles is more surely prevented.

In addition, in FIGS. 3 and 4, the nozzles 16A and the nozzles 16B are alternately arranged in a single row in the outer circumferential direction on the single surface Y perpendicular to the axis of rotation of the rotor 11, but may be alternately provided in multiple rows in the outer circumferential direction on multiple surfaces.

In the production apparatus shown in FIG. 1 as described above, the shear rate is set to 1000 to 200000 $sec^{-1}$, and more preferably set to 2000 to 100000 $sec^{-1}$, in the region into which the raw material solution A and the raw material solution B are introduced through the nozzles 16A and the nozzles 16B respectively, i.e., the region between the inner periphery of the rotor 11 and the outer periphery of the inner stator 13 in FIGS. 1 and 2. If the shear rate in this region is less than the lower limit, the aggregation of crystallites of the metal compounds and the structure in which the polymeric dispersant adsorbs onto multiple crystallites are not destructed. As a result, larger aggregates remain. Meanwhile, if the shear rate in this region exceeds the above-described limit, the polymeric dispersant is destructed, and hence a stable colloidal solution cannot be obtained.

There is a requirement for achieving such a shear rate. Specifically, since a rotation speed of the rotor and sizes of the gaps between the rotor and the stators have influences on the shear rate, the rotation speed and the sizes of the gaps need to be set so that the shear rate of the region can satisfy the above-described condition. A specific rotation speed of the rotor 11 is not particularly limited, and varies depending on the size of the apparatus. However, for example, in a case where the outer diameter of the inner stator 13 is 12.2 mm, the gap between the rotor 11 and the outer stator 12 is 0.5 mm, the gap between the rotor 11 and the inner stator 13 is 0.5 mm, and the inner diameter of the outer stator 12 is 18.8 mm, the above-described shear rate can be achieved by setting the rotation speed of the rotor 11 to preferably 750 to 140000 rpm, and more preferably 1500 to 72000 rpm. In addition, when the gap between the inner stator 13 and the rotor 11 is set to 0.2 mm, the maximum rotation speed of the rotor 11 can be reduced to preferably 60000 rpm, and more preferably 30000 rpm.

The size of the gap between the rotor 11 and the inner stator 13 is also not particularly limited, and varies depending on the size of the apparatus. However, the size is preferably 0.2 to 1.0 mm, and more preferably 0.5 to 1.0 mm. Moreover, the size of the gap between the rotor 11 and the outer stator 12 is not particularly limited, and varies depending on the size of the apparatus. However, the size is preferably 0.2 to 1.0 mm, and more preferably 0.5 to 1.0 mm. The shear rate in the above-described range can be achieved by adjusting the rotation speed of the rotor 11 correspondingly to the change in the sizes of the gaps. If these gaps are smaller than the lower limit, clogging of the gaps becomes more likely to occur. If these gaps are larger than the above-described limit, there is a tendency that an effective shearing force cannot be applied.

In addition, in the production apparatus shown in FIG. 1, the nozzles 16A and the nozzles 16B are preferably arranged so that the raw material solution A and the raw material solution B supplied through the nozzles 16A and the nozzles 16B respectively can be homogeneously mixed with each other within 1 msec (particularly preferably within 0.5 msec) after the introduction into the region. Note that the time from the introduction of the raw material solutions into the region to the completion of the homogeneous mixing herein refers to a time taken until the raw material solution A (or the raw material solution B) introduced through each nozzle 16A (or each nozzle 16B) reaches a position of an adjacent nozzle 16B (or an adjacent nozzle 16A), and mixed with the raw material solution B (or the raw material solution A) introduced through a corresponding one of the nozzles 16B (or the nozzles 16A).

Hereinabove, the apparatus suitably used in the present invention has been described. However, the present invention is not limited to the method using the production apparatus shown in FIG. 1. For example, in the production apparatus shown in FIG. 1, each of the nozzles 16A and the nozzles 16B is provided on the surface, of the inner stator 13, facing to the rotor 11, but each of the nozzles 16A and the nozzles 16B may be provided on a surface, of the outer stator 12, facing to the rotor 11. With such a configuration, the raw material solution A and the raw material solution B can be introduced independently of each other directly to the region between the rotor 11 and the outer stator 12. Note that the shear rate in the region needs to be set so that the above-described condition can be satisfied.

A flow rate of each of the raw material solutions in the first and second colloidal solution producing steps is not particularly limited, but preferably 1.0 to 30 ml/min. If the flow rate of the raw material solution is less than the lower limit, an efficiency of the production of the crystallites of the metal compounds and the aggregates thereof tends to be lowered. Meanwhile, if the flow rate exceeds the above-described limit, the particle diameters of the aggregates of the crystallites of the metal compounds tend to be large.

In addition, the cation concentration in each of the raw material solutions (the raw material solution A-1 and the raw material solution A-2) containing the metal ions is preferably 0.005 to 0.5 mol/L, and more preferably 0.01 to 0.3 mol/L. When the cation concentration is within the range, the crystallites of the metal compounds can be dispersed in a liquid in their original state or in a state of uniform aggregates having small diameters, and a colloidal solution excellent in storage stability can be obtained. In contrast, if the cation concentration is less than the lower limit, the yield of the crystallites of the metal compounds tends to be lowered. On the other hand, if the cation concentration exceeds the above-described limit, the distance between fine particles of the metal compounds in the colloidal solution becomes shorter than the size of association of the polymeric dispersant. Hence, the repulsive force due to steric hindrance by the adsorption of the polymeric dispersant does not act effectively, and the crystallites or the aggregates tend to further aggregate with each other.

Moreover, in the first and second colloidal solution producing steps, a polyalkyleneimine or a (meth)acrylic acid-based polymer is used as the polymeric dispersant. It is preferable to satisfy the following conditions, depending on the polymeric dispersant used.

<A Case where Polyalkyleneimine is Used as Polymeric Dispersant>

A weight average molecular weight of the polyalkyleneimine is preferably 3000 to 15000, and more preferably 8000 to 12000. When the weight average molecular weight of the polyalkyleneimine is within the above-described range, the crystallites of the metal compounds can be dispersed in their original state or in a state of uniform aggregates having small diameters, and a colloidal solution excellent in storage stability can be obtained. In contrast, if the weight average molecular weight of the polyalkyleneimine is less than the lower limit, the repulsive force due to steric hindrance is not developed efficiently even when the polyalkyleneimine adsorbs onto the fine particles of the metal compounds, and hence the fine particles of the metal compounds tend to aggregates. Meanwhile, if the weight average molecular weight exceeds the above-described limit, the polyalkyleneimine forms a cross-linking structure, and larger aggregates tend to be formed. Note that the above-described weight average molecular weight is a value measured by gel permeation chromatography (GPC) in terms of standard polystyrene.

In addition, the amount of the polyalkyleneimine contained in the obtained colloidal solution is preferably 10 to 35 mg/m$^2$, and more preferably 15 to 25 mg/m$^2$, relative to a unit surface area of the crystallites of the metal compounds. When the amount of the polyalkyleneimine contained is within the above-described range, the crystallites of the metal compounds can be dispersed in their original state or in a state of uniform aggregates having small diameters, and a colloidal solution excellent in storage stability can be obtained. In contrast, if the amount of the polyalkyleneimine contained is less than the lower limit, the polyalkyleneimine cannot cover the surfaces of the fine particles of the metal compounds sufficiently, and the fine particles of the metal compounds tend to aggregate to form larger aggregates. Meanwhile, if the amount exceeds the above-described limit, a large amount of free polyalkyleneimine is present in the colloidal solution, and hence the cross-linking reaction of the polyalkyleneimine tends to proceed markedly, resulting in formation of aggregates having large particle diameters.

In addition, the pH of the obtained colloidal solution is preferably adjusted to 0.5 to 5.5. When the pH of the colloidal solution is within the above-described range, the polyalkyleneimine dissociates to form $NH_3^+$ groups, and adsorb onto negatively charged sites or neutral sites of the crystallites of the metal compounds to thereby provide a dispersing effect. As a result, the crystallites of the metal compounds can be dispersed in their original state or in a state of uniform aggregates having small diameters, and a colloidal solution excellent in storage stability can be obtained. In contrast, when the pH is less than the lower limit, the surfaces of the crystallites of the metal compounds are positively charged to a large extend. Hence, the polyalkyleneimine in which the $NH_3^+$ groups are formed because of the dissociation hardly adsorbs onto the crystallites of the metal compound, and a sufficient repulsive force is not developed between the fine particles of the metal compounds. As a result, the fine particles of the metal compounds tend to aggregate. Meanwhile, if the pH exceeds the above-described limit, the degree of dissociation of the polyalkyleneimine is low, and an amount of the polyalkyleneimine adsorbed onto the fine particles of the metal compound is decreased. As a result, a sufficient repulsive force is not developed between the fine particles of the metal compounds, and the fine particles of the metal compounds tend to aggregate.

Moreover, in the region into which each of the raw material solution A and the raw material solution B are introduced, the shear rate is preferably set to 7500 $sec^{-1}$ or less (more preferably 6500 $sec^{-1}$ or less). If the shear rate in the region exceeds the above-described limit, the polyalkyleneimine is broken, and a sufficient repulsive force cannot be applied to the fine particles of the metal compounds. As a result, larger aggregates tend to be formed.

<A Case where (Meth)Acrylic Acid-Based Polymer is Used as Polymeric Dispersant>

Examples of the (meth)acrylic acid-based polymer include a homopolymer of (meth)acrylic acid, a copolymer of (meth)acrylic acid with a (meth)acrylic ester, a copolymer of (meth)acrylic acid with another vinyl monomer, or the like. Of these, a homopolymer of (meth)acrylic acid or a copolymer of (meth)acrylic acid with a (meth)acrylic ester is more preferable from the viewpoint of having a water-solubility.

The weight average molecular weight of the (meth)acrylic acid-based polymer is not particularly limited, but preferably 800 to 8000, and more preferably 800 to 3000. When the weight average molecular weight of the (meth)acrylic acid-based polymer is within the above-described range, the crystallites of the metal compounds remain in their original states, or form aggregates having small and uniform particle diameters, and a colloidal solution excellent in storage stability can be obtained. In contrast, if the weight average molecular weight of the (meth)acrylic acid-based polymer is less than the lower limit, the repulsive force due to steric hindrance or electrostatic repulsion is not developed efficiently even when the polymeric dispersant adsorbs onto the crystallites, and hence the crystallites tend to aggregates with each other. Meanwhile, if the weight average molecular weight exceeds the above-described limit, the polymeric dispersant is extremely larger than the crystallite, which means that many homogeneous adsorption sites are present in a molecule. As a result, the molecule is more likely to adsorb onto many crystallites, and larger aggregates tends to remain. Note that the above-described weight average molecular weight is a value measured by gel permeation chromatography (GPC) in terms of standard polystyrene.

In addition, the amount of the (meth)acrylic acid-based polymer contained in the obtained colloidal solution is preferably 9 to 21 $mg/m^2$, and more preferably 9 to 15 $mg/m^2$, relative to a unit surface area of the crystallites of the metal compounds. When the amount of the (meth)acrylic acid-based polymer contained is within the above-described range, the aggregates of the crystallites of the metal compounds have small particle diameters and become uniform, and a colloidal solution excellent in storage stability can be obtained. In contrast, if the amount of the (meth)acrylic acid-based polymer contained is less than the lower limit, the polymeric dispersant cannot cover the surfaces of the crystallite of the metal compounds sufficiently, and the crystallites tend to aggregate with each other to form larger aggregates. Meanwhile, if the content exceeds the above-described limit, a large amount of free polymeric dispersant is present in the colloidal solution, and hence the polymeric dispersant adsorbs onto many crystallites. As a result, larger aggregates tend to remain.

In addition, the pH of the obtained colloidal solution is preferably adjusted to 5.0 to 10.0, and more preferably to 6.0 to 9.0. Especially when a (meth)acrylic acid-based polymer in which a percentage of repeating units having hydrophilic groups is 90% or more and 100% or less of all repeating units is used as the (meth)acrylic acid-based polymer, the pH of the colloidal solution is further preferably adjusted to 5.0 or more and 10.0 or less. Meanwhile, when a (meth)acrylic acid-based polymer in which the percentage of repeating units having hydrophilic groups is 50% or more and less than 90% (more preferably 75% or more and less than 90%) is used, the pH of the colloidal solution is further preferably adjusted to 7.0 or more and 10.0 or less. By adjusting the pH of the colloidal solution to the above-described range, it is possible to obtain aggregates of crystallites of the metal compounds having small particle diameters and being uniform, and hence a colloidal solution excellent in storage stability can be obtained. In contrast, if the pH is less than the lower limit, the amount of the (meth)acrylic acid-based polymer adsorbed onto the crystallite of the metal compounds is decreased, and the crystallites tend to further aggregate with each other, because the carboxyl groups in the (meth)acrylic acid-based polymer do not dissociate. Meanwhile, if the pH exceeds the above-described limit, surfaces of the crystallites of the metal compounds are likely to be negatively charged, and the amount of the (meth)acrylic acid-based polymer adsorbed in which carboxyl groups dissociate is decreased, although it depends on the kind of the metal compound. As a result, the crystallites tend to further aggregate with each other.

Moreover, in the region into which each of the raw material solution A and the raw material solution B are introduced, the shear rate is preferably set to 3000 $sec^{-1}$ or more (more preferably 6000 $sec^{-1}$ or more). If the shear rate in the region is less than the lower limit, the aggregation of crystallites of the metal compounds and the structure in which the polymeric dispersant adsorbs onto multiple crystallites are not destructed. As a result, larger aggregates tend to remain.

(Colloidal Solution Mixing Step)

In the method for producing a porous composite metal oxide of the present invention, next, the first colloidal solution obtained in the first colloidal solution producing step and the second colloidal solution obtained in the second colloidal solution producing step are mixed with each other under a pH condition under which both of the first and second colloidal solutions can maintain a state of being dispersed in a liquid. Thus, a colloidal mixture liquid is obtained.

In this step, the pH condition under which both the first and second colloidal solutions can maintain the state of being dispersed in a liquid is set as appropriate depending on the polymeric dispersant or the like to be used. When the polyalkyleneimine is used as the polymeric dispersant, the pH condition is preferably 0.5 to 5.5 for the above-described reason. Meanwhile, when the (meth)acrylic acid-based polymer is used as the polymeric dispersant, the pH condition is preferably 5.0 to 10.0, and more preferably 6.0 to 9.0 for the above-described reason. Note that a state where the colloidal solutions can maintain the state of being dispersed in a liquid herein refers to a state where substantially no aggregation of nano particles and substantially no aggregation of aggregates of nano particles proceed in the colloidal solution.

A mixing method in this step is not particularly limited, and the mixing may be performed, for example, by common propeller stirring for approximately 5.0 to 12.0 hours. In addition, the ratio between the first colloidal solution and the second colloidal solution is not particularly limited, and the mixing ratio may be determined as appropriate depending on the intended composition of the porous composite metal oxide.

(Aggregation Step)

In the method for producing a porous composite metal oxide of the present invention, subsequently, the pH of the colloidal mixture liquid obtained in the colloidal solution mixing step is adjusted to a pH condition under which the colloidal mixture liquid cannot maintain the state of being dispersed in the liquid. Thus, aggregates are obtained.

In this step, the pH condition under which the colloidal mixture liquid cannot maintain the state of being dispersed in the liquid is set as appropriate depending on the polymeric dispersant or the like to be used. When the polyalkyleneimine is used as the polymeric dispersant, the pH condition is preferably 9.0 to 12.0, and more preferably 9.5 to 10.5. Meanwhile, when the (meth)acrylic acid-based polymer is used as the polymeric dispersant, the pH condition is preferably 0.5 to 4.0, and more preferably 3.0 to 4.0. Note that the state where the colloidal mixture liquid cannot maintain the state of being dispersed in the liquid herein refers to a state where the aggregation of nano particles and the aggregation of aggregates of nano particles proceed instantly in the colloidal mixture liquid.

In this step, a method for adjusting the pH is not particularly limited, and the pH may be adjusted to be within the predetermined range by, for example, adding an alkali such as ammonia water or an acid such as nitric acid.

In this step, the polymeric dispersant in the colloidal mixture liquid desorbs from the nano particles or the aggregates thereof, and the aggregation of the nano particles and the aggregates thereof proceeds instantly, to give aggregates in which uniformly dispersed state of two or more kinds of composite metal oxide is kept. The temperature and the time at this time are not particularly limited, and the uniformly dispersed state is preferably fixed by, for example, stirring at a temperature of 10 to 40° C. for approximately 5 to 60 seconds.

(Heat Treatment Step)

In the method for producing a porous composite metal oxide of the present invention, subsequently, the aggregates obtained in the aggregation step are subjected to a heat treatment, and thus the porous composite metal oxide of the present invention is obtained.

Conditions of the heat treatment in this step are not particularly limited, but the following conditions are preferable. Specifically, drying is performed in an oxidizing atmosphere (for example, air) under conditions of 80 to 100° C. and 1 to 10 hours then degreasing is performed under conditions of 300 to 400° C. and 1 to 5 hours, and then a temperature of 500 to 1100° C. is held for approximately 1 to 10 hours. If the conditions of the heat treatment are below the lower limits, there is a tendency that the metal compounds constituting the aggregates are not sufficiently converted into metal oxides. Meanwhile, if the conditions exceed the upper limits, deterioration in performance such as sintering tends to co-occur because of the high temperature and the oxidizing atmosphere.

Next, a method for producing a catalyst of the present invention will be described. The method for producing a catalyst of the present invention comprises the step of supporting a noble metal on a surface of a porous composite metal oxide obtained by the above-described production method of the present invention.

A specific method of supporting such a noble metal is not particularly limited, but, for example, the following method is suitably used. Specifically, the above-described porous composite metal oxide is immersed in a solution obtained by dissolving a salt of the noble metal (a nitrate, a chloride, an acetate, or the like) or a complex of the noble metal in a solvent such as water or alcohol, and then the solvent is removed, followed by calcination and grinding. Note that, in the step of supporting a noble metal, drying conditions in the removal of the solvent are preferably approximately 30 to 150° C. and within 10 minutes. Meanwhile, calcination conditions are preferably 250 to 300° C. and approximately 30 to 60 minutes in an oxidizing atmosphere (for example, air). Moreover, such a noble metal supporting step may be repeated until a desired supported amount is achieved.

Alternatively, another method for producing a catalyst of the present invention may be a method comprising the step of supporting, as an active species, at least one transition metal, an oxide thereof, or a mixture thereof on a surface of the porous composite metal oxide obtained by the above-described production method of the present invention, the transition metal being selected from the group consisting of Cu, Fe, Ni, Co, Mn, and Zn. A specific method of supporting such an active species is not particularly limited, but, for example, the following method is suitably used. Specifically, the above-described porous composite metal oxide is immersed in a solution obtained by dissolving a salt of a metal constituting the active species (a nitrate, a chloride, an acetate, or the like) or a complex of the metal in a solvent such as water or alcohol, and then the solvent is removed, followed by calcination and grinding. Note that, in the step of supporting an active species, drying conditions in the removal of the solvent are preferably approximately 30 to 150° C. and within 10 minutes. Meanwhile, calcination conditions are preferably approximately 250 to 800° C. and approximately 30 to 360 minutes in an oxidizing atmosphere (for example, air). Moreover, such an active species supporting step may be repeated until a desired supported amount is achieved.

Moreover, still another method for producing a catalyst of the present invention may be a method comprising the step of causing the porous composite metal oxide comprising the mixture of the first ultrafine particles containing alumina and the second ultrafine particles containing zirconia to further contain $CuAl_2O_4$ and $CuO$, which show excellent catalytic activities, as additional components, in the above-described step of obtaining a porous composite metal oxide of the present invention. A method of causing the additional components to be contained is not particularly limited, but, for example, the following method is suitably used. Specifically, a third colloidal solution containing Cu is prepared in a similar manner to that of the first colloidal solution or the second colloidal solution, and the third colloidal solution is homogeneously mixed with the first colloidal solution and the second colloidal solution.

EXAMPLES

Hereinafter, the present invention will be described more specifically on the basis of Examples and Comparative Examples. However, the present invention is not limited to Examples below.

Example 1

PEI, Mixing of $Al_2O_3$ Nanocolloid and CZY Nanocolloid, Acetates, MS-ACZY-62.5

<First and Second Colloidal Solution Producing Steps>

First, a raw material solution A-1, a raw material solution B-1, a raw material solution A-2, and a raw material solution B-2 were prepared as follows. Note that a polyethyleneimine used is represented by the following formula (1).

Raw material solution A-1: prepared by dissolving 9.38 g of aluminum nitrate in 307 g of ion-exchanged water.

Raw material solution B-1: prepared by dissolving 8.23 g of ammonium nitrate, 62.5 g of a polyethyleneimine having a molecular weight of 10000, and 115 g of nitric acid in 320 g of ion-exchanged water.

Raw material solution A-2: prepared by dissolving 12.7 g of cerium (III) acetate, 12.8 g of zirconium oxyacetate, and 1.7 g of yttrium acetate tetrahydrate in 500 g of ion-exchanged water. These added amount correspond to a cation concentration of 0.1 mol/L, where Ce:Zr:Y=38:57:5 (molar ratio).

Raw material solution B-2: prepared by dissolving 23.2 g of ammonium acetate, 13.6 g of an aqueous solution of hydrogen peroxide, 62.5 g of a polyethyleneimine having a molecular weight of 10000, and 130 g of acetic acid in 307 g of ion-exchanged water. The amounts of polyethyleneimine added correspond to 17.5 mg/m² of the surface area of particles.

[Chem. 1]

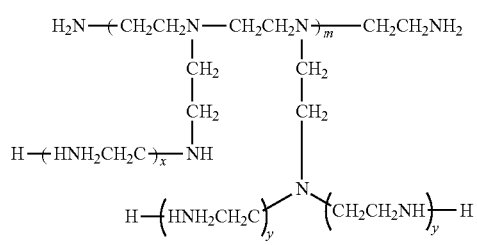

(1)

Next, by using the production apparatus (SUPER AGITATION REACTOR) shown in FIG. 1, a colloidal solution of $Al_2O_3$ (a first colloidal solution) and a colloidal solution of a $CeO_2$—$ZrO_2$—$Y_2O_3$ ternary metal compound (a second colloidal solution) were prepared. Note that as the stator 13, a 48-hole-type stator having 24 nozzles 16A and 24 nozzles 16B provided therein was used. Then, as shown in FIG. 1, an end of the homogenizer 10 was set to be immersed in a 100-ml beaker 20. While the rotor 11 of the homogenizer 10 was rotated at a rotation speed of 3400 rpm, the raw material solution A-1 and the raw material solution B-1 (or the raw material solution A-2 and the raw material solution B-2) were each supplied to a region between the rotor 11 and the inner stator 13 through the nozzles 16A and the nozzles 16B at a supply speed of 2.5 ml/min by using tube pumps (not illustrated), and were mixed with each other. Thus, the first colloidal solution (or the second colloidal solution) was prepared.

Note that the outer diameter of the rotor 11 was 18.4 mm, the inner diameter of the outer stator 12 was 18.8 mm, the gap between the rotor 11 and the outer stator 12 was 0.2 mm, and the shear rate in a region between the rotor 11 and the outer stator 12 was 16000 sec$^{-1}$. In addition, the outer diameter of the inner stator 13 was 12.0 mm, the inner diameter of the rotor 11 was 13.0 mm, the gap between the rotor 11 and the inner stator 13 was 0.5 mm, and the shear rate in the region between the rotor 11 and the inner stator 13 was 4600 sec$^{-1}$. In addition, the time taken from the introduction of the raw material solution A and the raw material solution B into the region to the completion of the homogeneous mixing was 0.371 msec.

<Measurement of Average Aggregate Particle Diameters of Nano Particles of Metal Compounds>

In-liquid average aggregate particle diameters of nano particles of metal compounds in the obtained colloidal solutions ($Al_2O_3$ nanocolloid and CZY nanocolloid) were measured by a dynamic light scattering method (Nanotrac UPA-EX250 manufactured by NIKKISO CO., LTD.). Table 1 shows the obtained results. Note that the average aggregate particle diameter refers to an average particle diameter of individual particles which are in an independently dispersed state in the colloidal solution.

<Colloidal Solution Mixing Step>

The obtained first colloidal solution (pH 3.8) and the obtained second colloidal solution (pH 4.9) were weighed out so as to correspond to Al:Ce:Zr:Y=50:38:57:5 (molar ratio), and subjected to propeller stirring under conditions of 300 rpm and 12 hours. Thus, a colloidal solution mixture (pH 4.5) was obtained.

<Confirmation of Two-Phase Mixture Crystal>

The obtained colloidal solution mixture was dried at 150° C. From an XRD pattern of the pasty sample obtained by use of Cu Kα radiation, broad peaks were observed at around 2θ=25° and 40°. However, identification of the crystal structure was not possible. Subsequently, another heat treatment was conducted at 1000° C. for 5 hours. In an XRD pattern after the heat treatment, composite oxide crystals in which zirconium oxide and yttrium oxide were solid-dissolved in cerium oxide were observed. However, no peaks of alumina were observed. This was presumably because the alumina was fine, and no segregation occurred.

<Aggregation Step>

Aggregates were obtained by adjusting the pH of the obtained colloidal solution mixture to 9.5 by a method in which ammonia water was added to the obtained colloidal solution mixture over 10 seconds with stirring.

<Heat Treatment Step>

The obtained aggregates were dried by being held in air at 80° C. for 10 hours, then degreased by being held in air at 400° C. for 1 hour, and then subjected to a heat treatment by further being held in air at 1000° C. for 5 hours. Thus, a porous composite metal oxide was obtained.

<Measurement of Physical Properties of Porous Composite Metal Oxide>

The obtained porous composite metal oxide was measured for a specific surface area by a BET method, an average pore diameter and a pore volume by a nitrogen adsorption method, and moreover a crystallite diameter (a primary particle diameter) of a crystal phase of the composite metal oxide in which zirconium oxide and yttrium oxide were solid-dissolved in cerium oxide by XRD. Table 2 shows the obtained results.

<Calculation of Standard Deviation>

Figure 5:
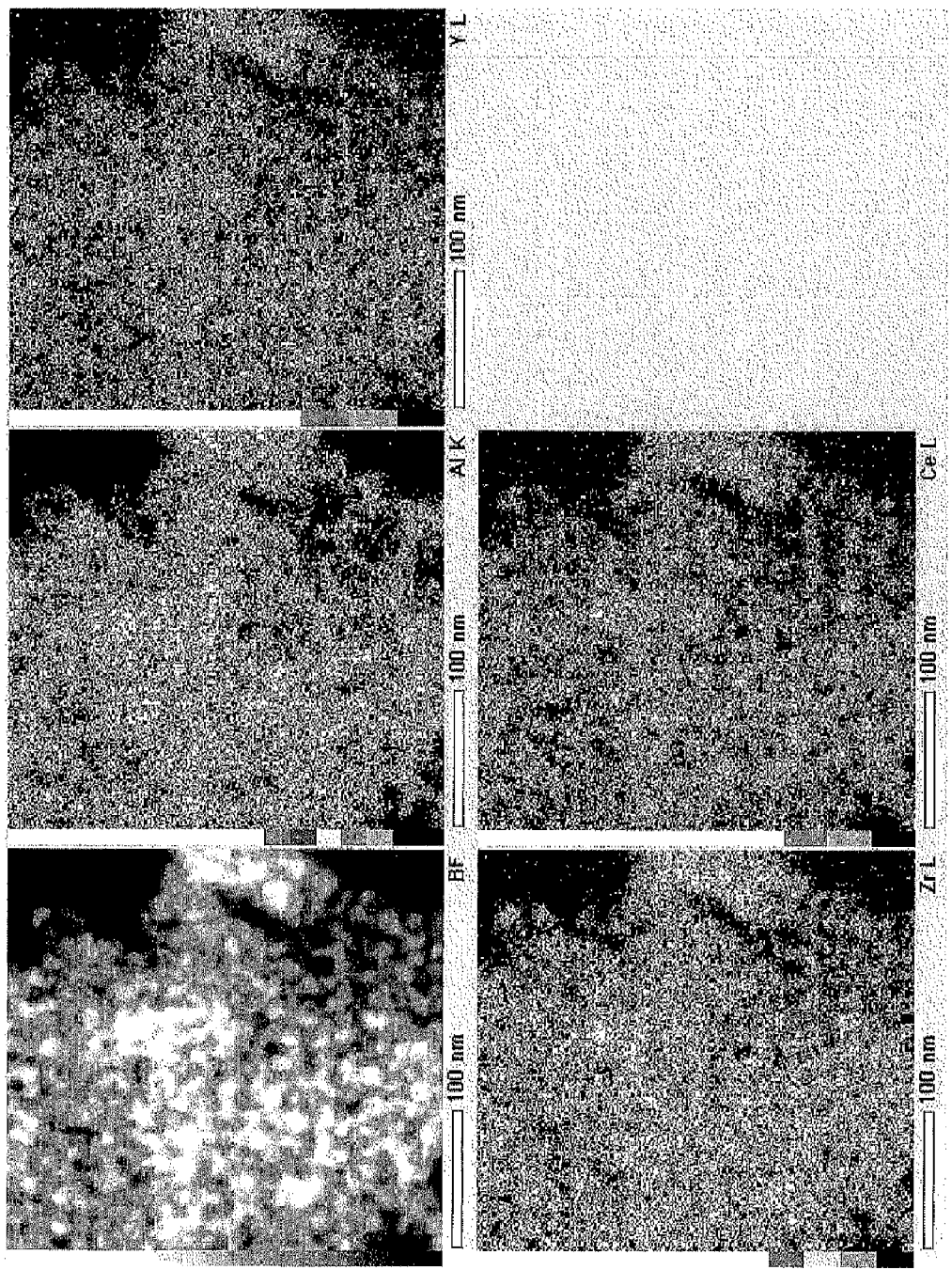
FIG. 5 shows microphotographs showing composition distributions where composition ratios in a porous composite metal oxide obtained in Example 1 are mapped, respectively.

The shapes of particles of the obtained porous composite metal oxide were observed by using a STEM (manufactured by JEOL Ltd., JEM-2100F Cs corrector). In addition, 100 sets of data on composition ratios (% by mass) of Al, Ce, Zr, and Y were collected within an area of 20 nm square by using an EDS apparatus attached to the STEM. Then, average values thereof and standard deviations thereof relative to the corresponding average values were calculated. Table 3 shows the obtained results. In addition, Table 4 shows standard deviations obtained for an area of 10 nm square by a similar method. Furthermore, FIG. 5 shows composition distributions, where the composition ratios of Al, Ce, Zr, and Y are shown on maps {scanning transmission electron microscope photographs (HAADF images) and mapping images (EDS mapping images) of respective elements in the same visual fields}.

<Durability Test>

By using an aqueous solution of dinitro diamine platinate, Pt was supported on the porous composite metal oxide at 0.2 g per 100 g of the obtained powder of the porous composite metal oxide, and calcined in air at 300° C. for 3 hours. Subsequently, the obtained powder was shaped by using a cold isostatic pressing machine at 1000 kgf/cm$^2$, and then ground to have a φ of 0.5 to 1 mm. Thus a pellet catalyst was obtained.

Subsequently, a rich gas and a lean gas were alternately supplied to 2 g of the obtained catalyst for 5 hours under conditions of a temperature of 1000° C. and a space velocity (SV) of 10000 h$^{-1}$, while being switched to each other at intervals of 5 minutes. Here, the rich gas was made of CO (2% by volume), $CO_2$ (10% by volume), $O_2$ (0% by volume), $H_2O$ (3% by volume), and $N_2$ (the balance), and the lean gas was made of CO (0%), $CO_2$ (10% by volume) $O_2$ (1% by volume), $H_2O$ (3% by volume), and $N_2$ (the balance).

<Evaluation of Catalytic Activity>

One gram of the catalyst after the durability test was placed in a normal pressure fixed bed flow type reactor (BEST INSTRUMENTS CO., Ltd.), and evaluated for the catalytic activities. Specifically, a model gas made of CO (0.7% by volume), $H_2$ (0.23 by volume), NO (0.12% by volume), $C_3H_6$ (0.16% by volume), $O_2$ (0.64% by volume), $CO_2$ (10% by volume), $H_2O$ (3% by volume), and $N_2$ (the balance) was supplied to the catalyst at a gas flow rate of 7000 mL/min. The temperature of gas entering the catalyst was adjusted to 100° C., and a CO concentration, a $C_3H_6$ concentration, and a NO concentration in the gas entering the catalyst were measured. Thereafter, a pretreatment was performed in which the temperature of the gas entering the catalyst was raised to 500° C. at a rate of temperature rise of 50° C./min, and held for 10 minutes. Subsequently, the gas entering the catalyst was cooled to 100° C. Then, while the temperature of the gas entering the catalyst was again raised to 500° C. at a rate of temperature rise of 15° C./min, a CO concentration, a $C_3H_6$ concentration, and a NO concentration in the gas exiting from the catalyst were measured. The purification ratio of each of CO, $C_3H_6$, and NO was calculated from the difference between the corresponding measured values of the gas entering the catalyst and the gas exiting from the catalyst. In addition, a temperature (T50-CO, T50-$C_3H_6$, or T50-NO) at which the purification ratio of CO, $C_3H_6$ or NO in the supplied model gas reached 50% was measured. Table 5 shows the obtained results. In addition, the purification ratios of CO, $C_3H_6$ and NO at 500° C. were all 100%.

Example 2

PEI, Mixing of $Al_2O_3$ Nanocolloid and CZY Nanocolloid, Nitrates, MN-ACZY-62.5

First, a raw material solution A-2, and a raw material solution B-2 were prepared as follows.

Raw material solution A-2: prepared by dissolving 10.9 g of diammonium cerium nitrate, 7.6 g of zirconyl oxynitrate, and 1.0 g of yttrium nitrate in 500 g of ion-exchanged water. Raw material solution B-2: prepared by dissolving 15.0 g of ammonium nitrate, 62.5 g of a polyethyleneimine having a molecular weight of 10000, and 115 g of nitric acid in 320 g of ion-exchanged water.

A first colloidal solution (pH 1.0) and a second colloidal solution (pH 1.0) were prepared in a similar manner to that in Example 1, except that the above-described raw material solutions were each used as the raw material solution A-2 and the raw material solution B-2.

Subsequently, in-liquid average (aggregate) particle diameters of nano particles of the metal compounds in the colloidal solutions were measured in a similar manner to that in Example 1. Table 1 shows the obtained results.

In addition, by using the obtained colloidal solutions, the colloidal solution mixing step, the aggregation step, and the heat treatment step were performed in a similar manner to that in Example 1. The obtained porous composite metal oxide was measured for a specific surface area, an average pore diameter, a pore volume, and a crystallite diameter (a primary particle diameter) in a similar manner to that in Example 1. Table 2 shows the obtained results.

Figure 6:
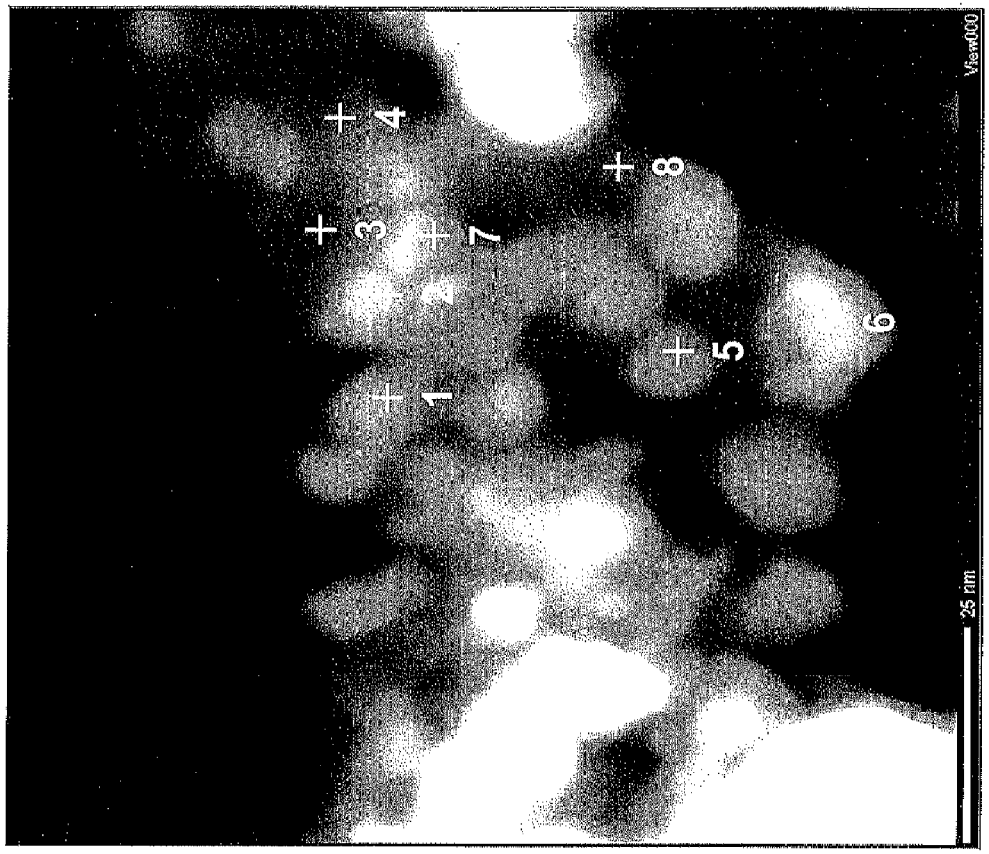
FIG. 6 is a microphotograph showing results obtained by measuring composition distributions in a porous composite metal oxide obtained in Example 2.
Figure 7:
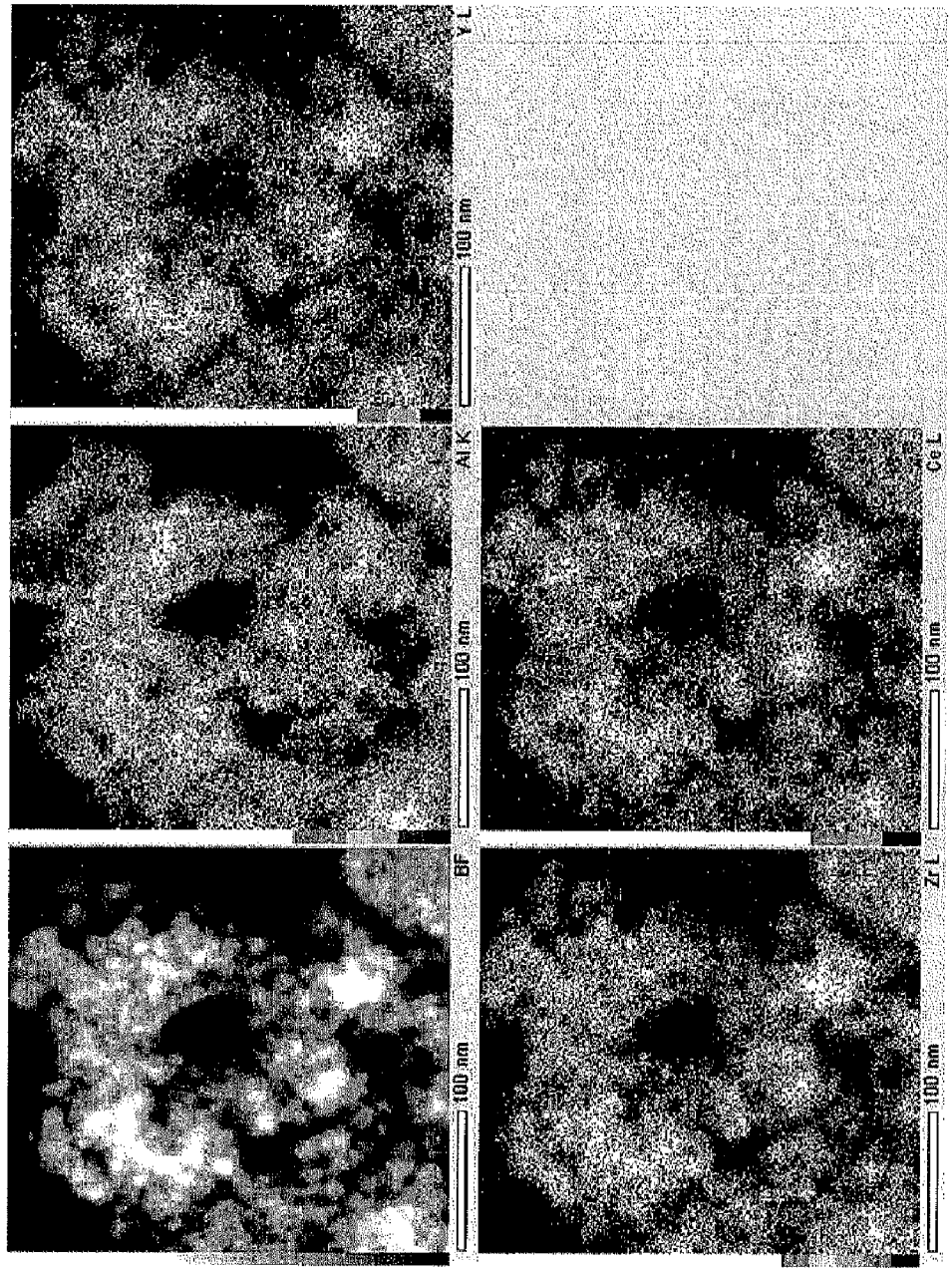
FIG. 7 shows microphotographs showing composition distributions where composition ratios in the porous composite metal oxide obtained in Example 2 are mapped, respectively.

In addition, average values of data of composition ratios (% by mass) of Al, Ce, Zr, and Y in the obtained porous composite metal oxide, and standard deviations thereof were determined in a similar manner to that in Example 1. Tables 3 and 4 show the obtained results. In addition, composition ratios (% by mass) of Al, Ce, Zr, Y, and O in each particle were examined by an observation with a higher magnification. FIG. 6 shows the obtained results. Also from the results, it was found that the particles are two-phase mixture particles of $Al_2O_3$ particles and CZY particles. In addition, FIG. 7 shows composition distributions (HAADF images and EDS mapping images) where composition ratios of Al, Ce, Zr, and Y are mapped, respectively.

Moreover, by using the obtained porous composite metal oxide, evaluation of catalytic activities after the durability test was performed in a similar manner to that in Example 1 to determine a T50-CO, a T50-$C_3H_6$ and a T50-NO. Table 5 shows the results. In addition, purification ratios of CO, $C_3H_6$ and NO at 500° C. were all 100%.

Example 3

PEI, mixing of AZL Nanocolloid, Acetates, MS-AZL-62.5

First, a raw material solution A-1, a raw material solution B-1, a raw material solution A-2, and a raw material solution B-2 were prepared as follows.

Raw material solution A-1: prepared by dissolving 9.38 g of aluminum nitrate in 500 g of ion-exchanged water.

Raw material solution B-1: prepared by dissolving 8.23 g of ammonium nitrate, 62.5 g of a polyethyleneimine having a molecular weight of 10000, and 115 g of nitric acid in 320 g of ion-exchanged water.

Raw material solution A-2: prepared by dissolving 22.5 g of zirconium oxyacetate and 1.7 g of lanthanum acetate 1.5 hydrate in 500 g of ion-exchanged water.

Raw material solution B-2: prepared by dissolving 21.6 g of ammonium acetate, 62.5 g of a polyethyleneimine having a molecular weight of 10000, and 130 g of acetic acid in 308 g of ion-exchanged water.

A first colloidal solution (pH 3.8) and a second colloidal solution (pH 4.9) were prepared in a similar manner to that in Example 1, except that the above-described raw material solutions were each used as the raw material solution A-1, the raw material solution B-1, the raw material solution A-2, and the raw material solution B-2. These added amounts correspond to a cation concentration of 0.1 mol/L.

Subsequently, in-liquid average (aggregate) particle diameters of nano particles of the metal compounds in the colloidal solutions were measured in a similar manner to that in Example 1. Table 1 shows the obtained results.

Next, a colloidal solution mixture was obtained by performing the propeller stirring under conditions of 300 rpm and 12 hours in a similar manner to that in Example 1, except that the first colloidal solution and the second colloidal solution were weighed out in a ratio of Al:Zr:La=400:95:5 (molar ratio).

From an XRD pattern of a sample obtained by subjecting the obtained colloidal solution mixture to a heat treatment at 1000° C. for 5 hours, it was found that the sample was in the form of a two-phase mixture crystal made of a composite oxide crystal in which lanthanum was solid-dissolved in zirconium oxide and a crystal of alumina.

In addition, by using the obtained colloidal solution mixture, the aggregation step and the heat treatment step were performed in a similar manner to that in Example 1. The obtained porous composite metal oxide was measured for a specific surface area, an average pore diameter, and a pore volume in a similar manner to that in Example 1. Table 2 shows the obtained results.

Figure 8:
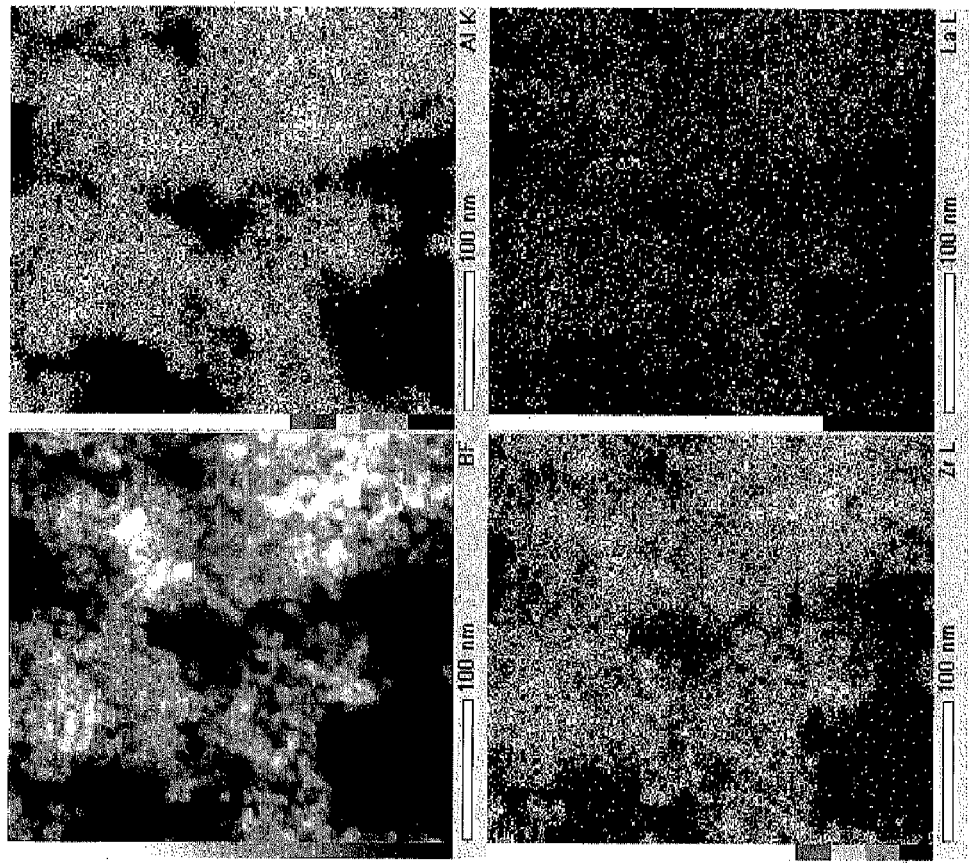
FIG. 8 shows microphotographs showing composition distributions where composition ratios in a porous composite metal oxide obtained in Example 3 are mapped, respectively.

Moreover, average values of data of composition ratios (% by mass) of Al, Zr, and La in the obtained porous composite metal oxide, and standard deviations thereof were determined in a similar manner to that in Example 1. Tables 3 and 4 show the obtained results. In addition, FIG. 8 shows composition distributions (HAADF images and EDS mapping images) where composition ratios of Al, Zr, and La are mapped, respectively.

Comparative Example 1

PEI, Coprecipitation of All ACZY, Acetates, JKS-ACZY-62.5

In 500 g of ion-exchanged water, 4.36 g of cerium (III) acetate, 4.51 g of zirconium oxyacetate, 0.68 g of yttrium acetate tetrahydrate, and 24.4 g of aluminum nitrate were dissolved. Thus, an aqueous solution (a first solution) of salts containing cations to serve as raw materials of the composite metal oxide was prepared. These added amounts correspond to a cation concentration of 0.1 mol/L, where Al:Ce:Zr:Y=50:37:57:5 (molar ratio). Meanwhile, 34.6 g of ammonium acetate, 13.6 g of an aqueous solution of hydrogen peroxide, 62.5 g of a polyethyleneimine having a molecular weight of 10000, and 130 g of acetic acid were dissolved in 307 g of ion-exchanged water. Thus, a neutralizing aqueous solution was prepared (a second solution).

Next, the second solution was poured into a 1-L beaker. While the solution in the beaker was stirred by using a propeller having a diameter of 72 mm at 300 rpm which corresponded to an average shear rate of 470 sec$^{-1}$ between a position of an outer periphery of the propeller and a position 1.7 mm away from the outer periphery of the propeller, the first solution was introduced rapidly into the beaker. Then, the propeller stirring was performed for 10 minutes. Thus, a colloidal solution (pH 4.5) was prepared.

Subsequently, an in-liquid average (aggregate) particle diameter of nano particles of the metal compound in the colloidal solution was measured in a similar manner to that in Example 1. Table 1 shows the obtained result.

In addition, the aggregates in the obtained colloidal solution were subjected to a heat treatment in a similar manner to that in Example 1. Thus, a porous composite metal oxide was obtained. The obtained porous composite metal oxide was measured for a specific surface area, an average pore diameter, a pore volume, and a crystallite diameter (a primary particle diameter) in a similar manner to that in Example 1. Table 2 shows the obtained results.

Figure 9:
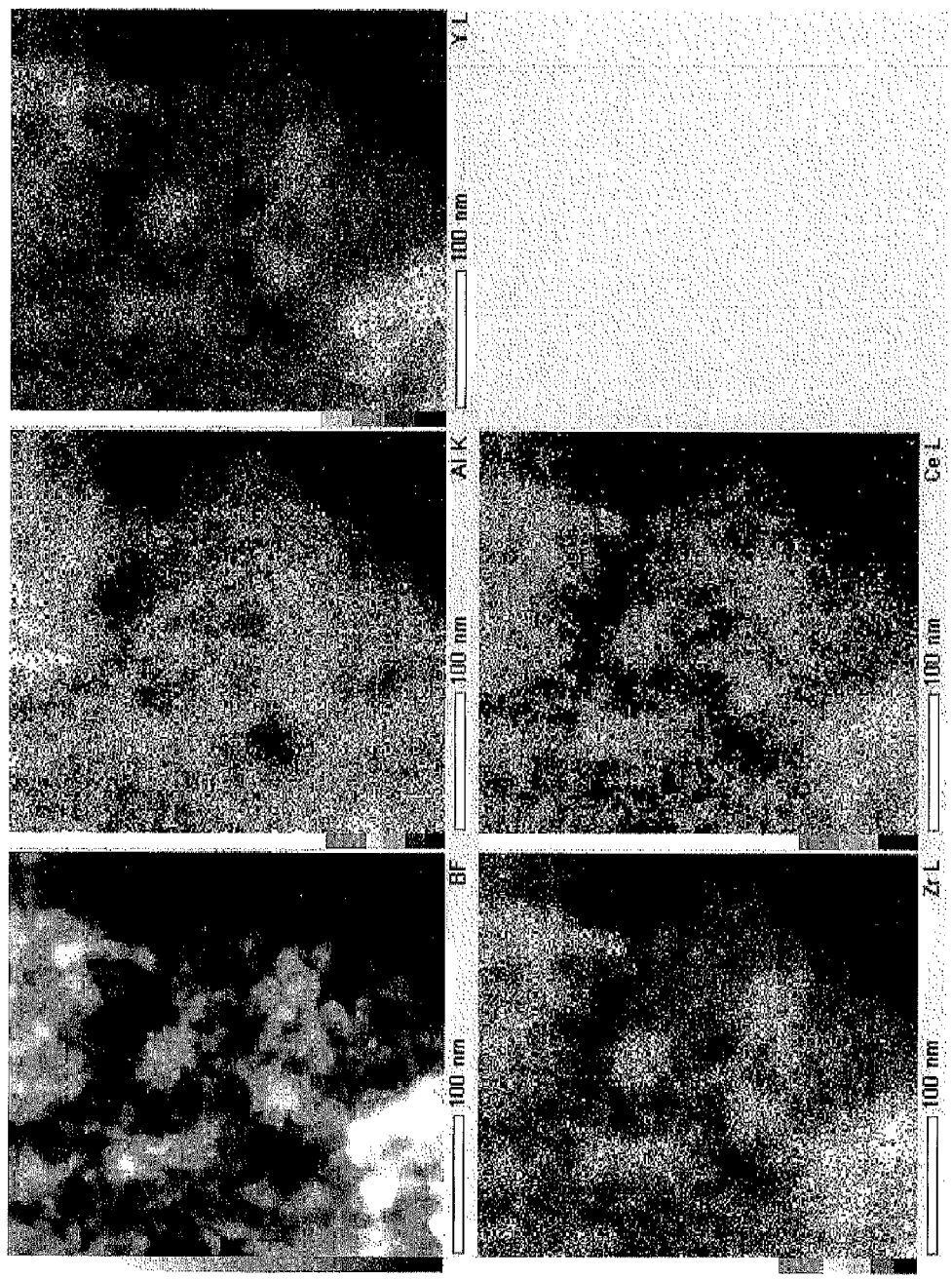
FIG. 9 shows microphotographs showing composition distributions where composition ratios in a porous composite metal oxide obtained in Comparative Example 1 are mapped, respectively.

In addition, average values of data of composition ratios (% by mass) of Al, Ce, Zr, and Y in the obtained porous composite metal oxide, and standard deviations thereof with respect to the feed composition were determined in a similar manner to that in Example 1. Tables 3 and 4 show the obtained results. In addition, FIG. 9 shows composition distributions (HAADF images and EDS mapping images) where composition ratios of Al, Ce, Zr, and Y are mapped, respectively.

Moreover, by using the obtained porous composite metal oxide, evaluation of catalytic activities after the durability test was performed in a similar manner to that in Example 1 to determine a T50-CO, a T50-$C_3H_6$ and a T50-NO. Table 5 shows the obtained results. In addition, purification ratios of CO, $C_3H_6$ and NO at 500° C. were all 100%.

Comparative Example 2

Without PEI, Coprecipitation of All ACZY, Acetates, JKS-ACZY-0

A sol of a composite metal compound (pH 6.8) was prepared by performing the propeller stirring in a similar manner to that in Comparative Example 1, except that a neutralizing solution obtained by dissolving 34.6 g of ammonium acetate and 13.6 g of an aqueous solution of hydrogen peroxide in 500 g of ion-exchanged water was used as the second solution.

Subsequently, an in-liquid average (aggregate) particle diameter of particles of the metal compound in the sol of the composite metal compound was measured in a similar manner to that in Example 1. However, it was unable to measure the aggregate particle diameter by the dynamic light scattering method, because the aggregate particle diameter exceeded the upper limit of the measurement with the apparatus. As shown in Table 1, it was found that the aggregation proceeded to such a large extent that the aggregate particle diameter reached several microns or more.

In addition, the aggregates in the obtained sol of the composite metal compound were subjected to a heat treatment in a similar manner to that in Example 1. Thus, a porous composite metal oxide was obtained. The obtained porous composite metal oxide was measured for a specific surface area, an average pore diameter, a pore volume, and a crystallite diameter (a primary particle diameter) in a similar manner to that in Example 1. Table 2 shows the obtained results.

Figure 10:
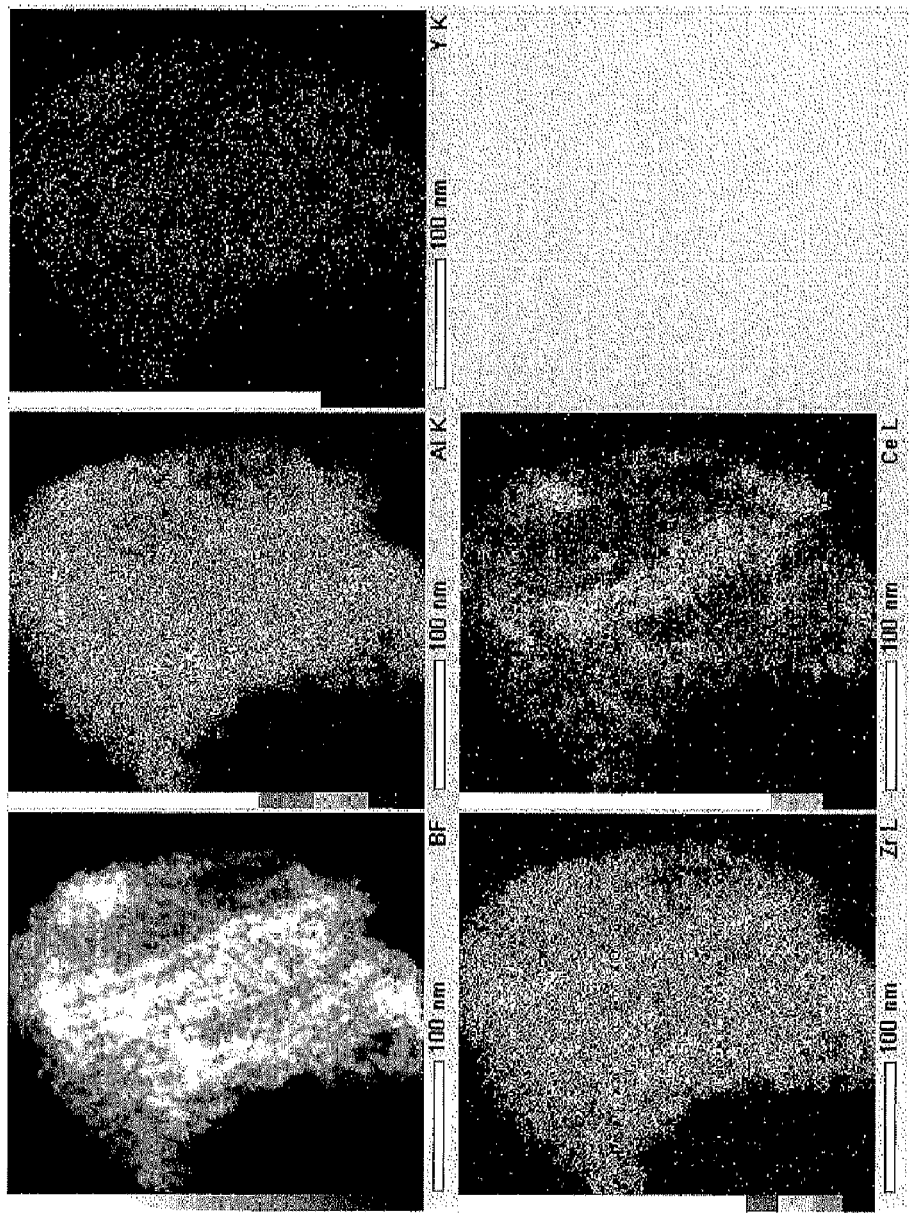
FIG. 10 shows microphotographs showing composition distributions where composition ratios in a porous composite metal oxide obtained in Comparative Example 2 are mapped, respectively.

In addition, average values of data of composition ratios (% by mass) of Al, Ce, Zr, and Y in the obtained porous composite metal oxide, and standard deviations thereof with respect to the feed composition were measured in a similar manner to that in Example 1. Tables 3 and Table 4 show the obtained results. In addition, FIG. 10 shows composition distributions (HAADF images and EDS mapping images) where composition ratios of Al, Ce, Zr, and Y are mapped, respectively.

Moreover, by using the obtained porous composite metal oxide, evaluation of catalytic activities after the durability test was performed in a similar manner to that in Example 1 to determine a T50-CO, a T50-$C_3H_6$, and a T50-NO. Table 5 shows the obtained results. In addition, purification ratios of CO, $C_3H_6$ and NO at 500° C. were all 100%.

Comparative Example 3

Without PEI, Coprecipitation of All ACZY, Nitrates, JKN-ACZY-0

A sol of a composite metal compound (pH 11.0) was prepared by performing the propeller stirring in a similar manner to that in Comparative Example 1, except that a solution obtained by dissolving 7.5 g of cerium (III) nitrate, 7.1 g of zirconium oxynitrate dihydrate, 1.0 g of yttrium nitrate hexahydrate, and 32.5 g of aluminum nitrate nonahydrate in 500 g of ion-exchanged water was used as the first solution, and that a solution obtained by dissolving 32.9 g of ammonia water having a concentration of 25% in 500 g of ion-exchanged water was used as the second solution.

Subsequently, an in-liquid average (aggregate) particle diameter of particles of the metal compound in the sol of the composite metal compound was measured in a similar manner to that in Example 1. However, it was unable to measure the aggregate particle diameter by the dynamic light scattering method, because the aggregate particle diameter exceeded the upper limit of the measurement with the apparatus. As shown in Table 1, it was found that the aggregation proceeded to such a large extent that the aggregate particle diameters reached several microns or more.

In addition, the aggregates in the obtained sol of the composite metal compound were subjected to a heat treatment in a similar manner to that in Example 1. Thus, a porous composite metal oxide was obtained. The obtained porous composite metal oxide was measured for a specific surface area, an average pore diameter, a pore volume, and a crystallite diameter (a primary particle diameter) in a similar manner to that in Example 1. Table 2 shows the obtained results.

Figure 11:
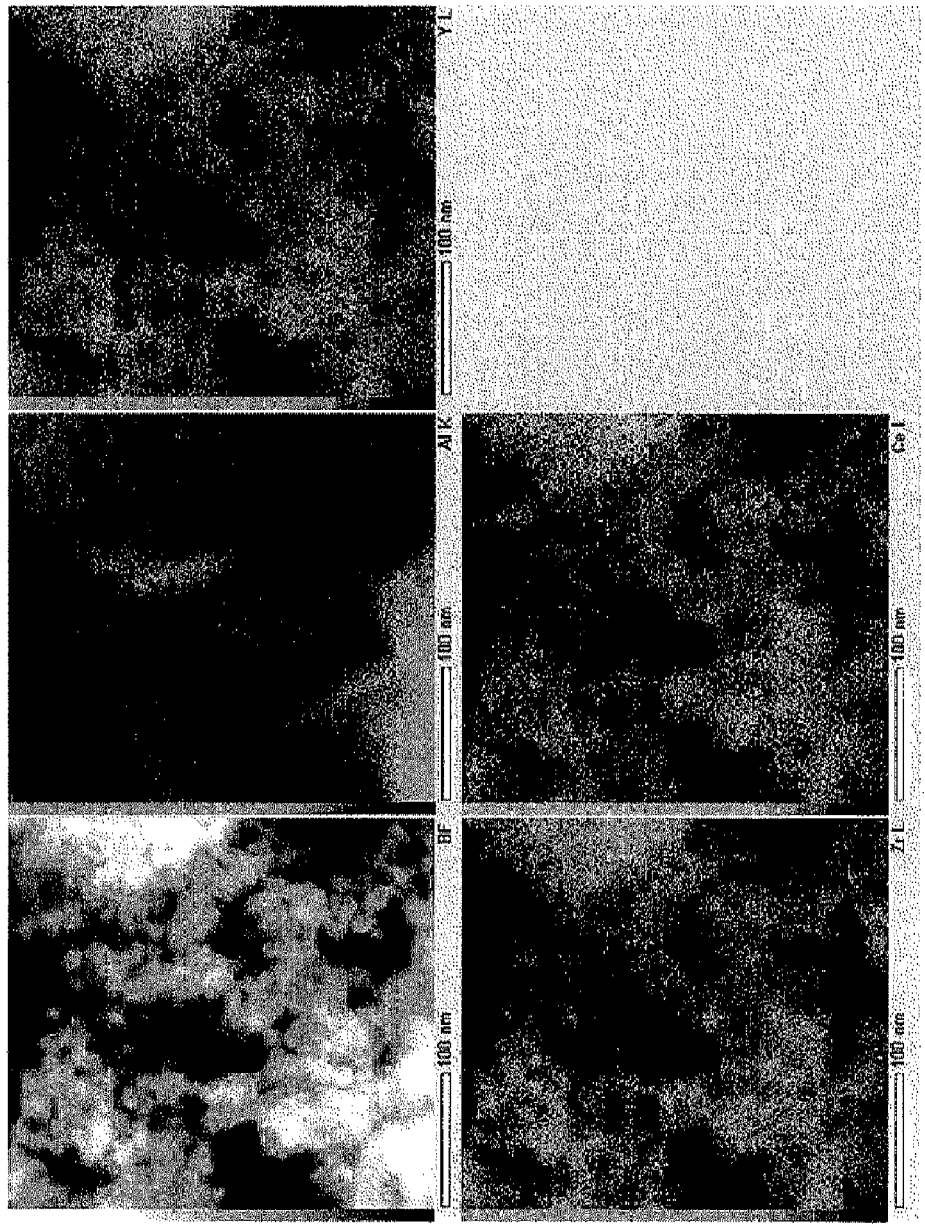
FIG. 11 shows microphotographs showing composition distributions where composition ratios in a porous composite metal oxide obtained in Comparative Example 3 are mapped, respectively.

In addition, average values of data of composition ratios (% by mass) of Al, Ce, Zr, and Y in the obtained porous composite metal oxide, and standard deviations thereof with respect to the feed composition were determined in a similar manner to that in Example 1. Tables 3 and 4 show the obtained results. In addition, FIG. 11 shows composition distributions (HAADF images and EDS mapping images) where composition ratios of Al, Ce, Zr, and Y are mapped, respectively.

Moreover, by using the obtained porous composite metal oxide, evaluation of catalytic activities after the durability test was performed in a similar manner to that in Example 1 to determine a T50-CO, a T50-$C_3H_6$, and a T50-NO. Table 5 shows the obtained results. In addition, purification ratios of CO, $C_3H_6$ and NO at 500° C. were all 100%.

Comparative Example 4

PEI, Mixing of $Al_2O_3$ Nanocolloid and CZY Nanocolloid, Nitrates, MN-ACZY-DpH-62.5

A first sol of a composite metal compound (pH 4.5) and a second sol of a composite metal compound (pH 2.5) were prepared in a similar manner to that in Example 2, except that the pH of the obtained sol of the metal oxide was changed to 4.5 by changing the amount of nitric acid used for obtaining the first colloidal solution to 50 g, and that the pH of the sol of the composite metal compound was changed to 2.5 by changing the amount of nitric acid used for obtaining the second colloidal solution to 80 g.

Subsequently, in-liquid average (aggregate) particle diameters of particles of the metal compounds in the sols of the composite metal compounds were measured in a similar manner to that in Example 1. However, it was unable to measure the aggregate particle diameter by the dynamic light scattering method, because the aggregate particle diameter exceeded the upper limit of the measurement with the apparatus. As shown in Table 1, it was found that the aggregation proceeded to such a large extent that the aggregate particle diameters reached several microns or more.

In addition, by using the obtained sols of the composite metal compounds, the colloidal solution mixing step, the aggregation step, and the heat treatment step were preformed in a similar manner to that in Example 1. The obtained porous composite metal oxide was measured for a specific surface area, an average pore diameter, a pore volume, and a crystallite diameter (a primary particle diameter) in a similar manner to that in Example 1. Table 2 shows the obtained results.

Figure 12:
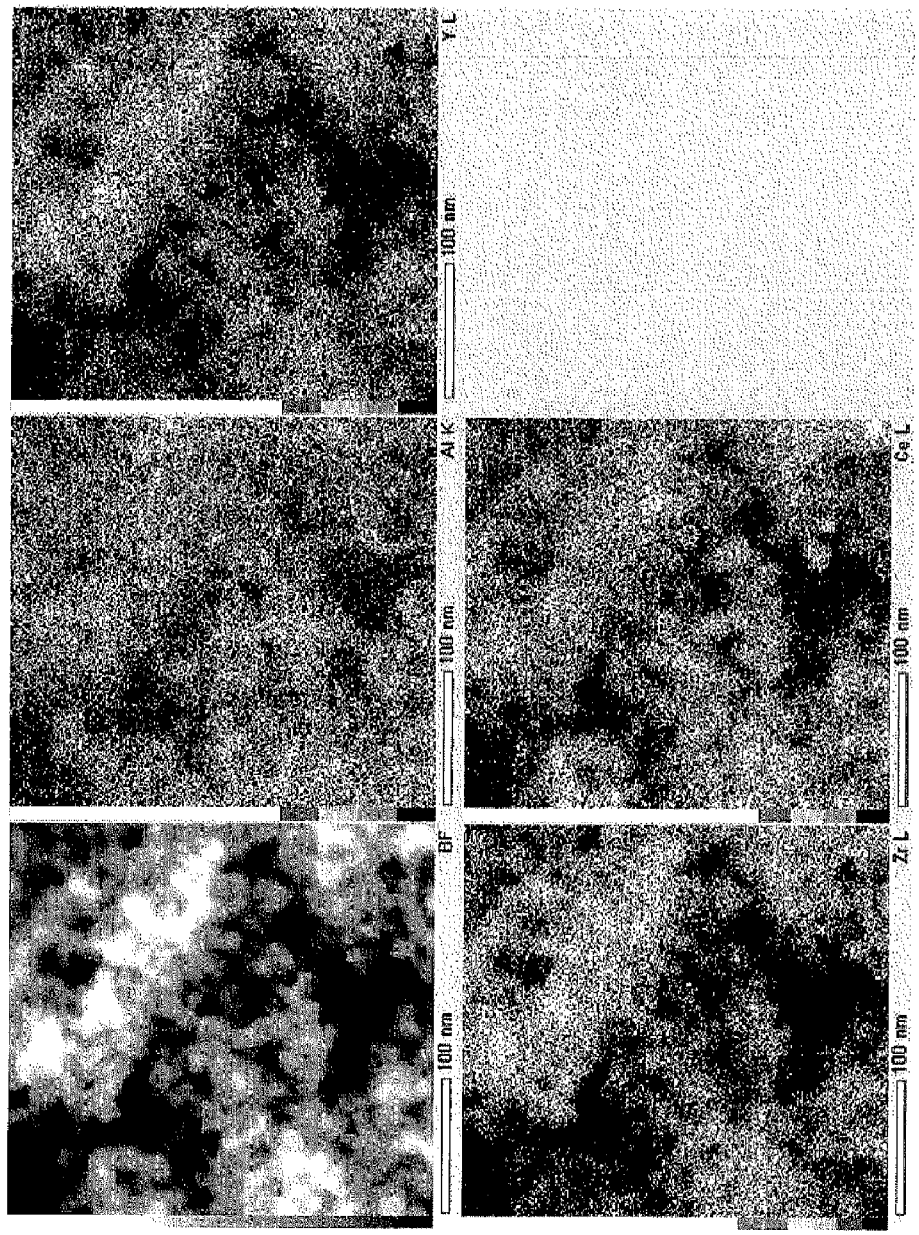
FIG. 12 shows microphotographs showing composition distributions where composition ratios in a porous composite metal oxide obtained in Comparative Example 4 are mapped, respectively.

In addition, average values of data of composition ratios (% by mass) of Al, Ce, Zr, and Y in the obtained porous composite metal oxide and standard deviations thereof with respect to the feed composition were determined in a similar manner to that in Example 1. Tables 3 and 4 show the obtained results. In addition, FIG. 12 shows composition distributions (HAADF images and EDS mapping images) where composition ratios of Al, Ce, Zr, and Y are mapped, respectively.

Moreover, by using the obtained porous composite metal oxide, evaluation of catalytic activities after the durability test was performed in a similar manner to that in Example 1 to determine a T50-CO, a T50-$C_3H_6$, and a T50-NO Table 5 shows the obtained results. In addition, the purification ratios of CO, $C_3H_6$ and NO at 500° C. were all 100%.

Comparative Example 5

PVP, Mixing of $Al_2O_3$ Nanocolloid and CZY Nanocolloid, Nitrates, MN—ACZY—PVP

First, a raw material solution B-1 and a raw material solution B-2 were prepared as follows.

Raw material solution B-1: prepared by dissolving 30.1 g of ammonium nitrate and 11.3 g of polyvinylpyrrolidone (PVP) having a molecular weight of 24000 in 500 g of ion-exchanged water.

Raw material solution B-2: prepared by dissolving 30.1 g of ammonium nitrate and 11.3 g of polyvinylpyrrolidone (PVP) having a molecular weight of 24000 in 500 g of ion-exchanged water.

A first sol of a composite metal compound (pH 6.5) and a second sol of a composite metal compound (pH 6.3) were prepared in a similar manner to that in Example 2, except that the above-described raw material solutions were each used as the raw material solution B-1 and the raw material solution B-2. The amounts of PVP added correspond to 12.0 mg/m$^2$ of the surface area of the particles.

Subsequently, in-liquid average (aggregate) particle diameters of particles of the metal compounds in the sols of the composite metal compounds were measured in a similar manner to that in Example 1. However, it was unable to measure the aggregate particle diameter by the dynamic light scattering method, because the aggregate particle diameter exceeded the upper limit of the measurement with the apparatus. As shown in Table 1, it was found that the aggregation proceeded to such a large extent that the aggregate particle diameter reached several microns or more.

In addition, by using the obtained sols of the composite metal compounds, the colloidal solution mixing step, the aggregation step, and the heat treatment step were performed in a similar manner to that in Example 1. The obtained porous composite metal oxide was measured for a specific surface area, an average pore diameter, and a pore volume in a similar manner to that in Example 1. Table 2 shows the obtained results.

Figure 13:
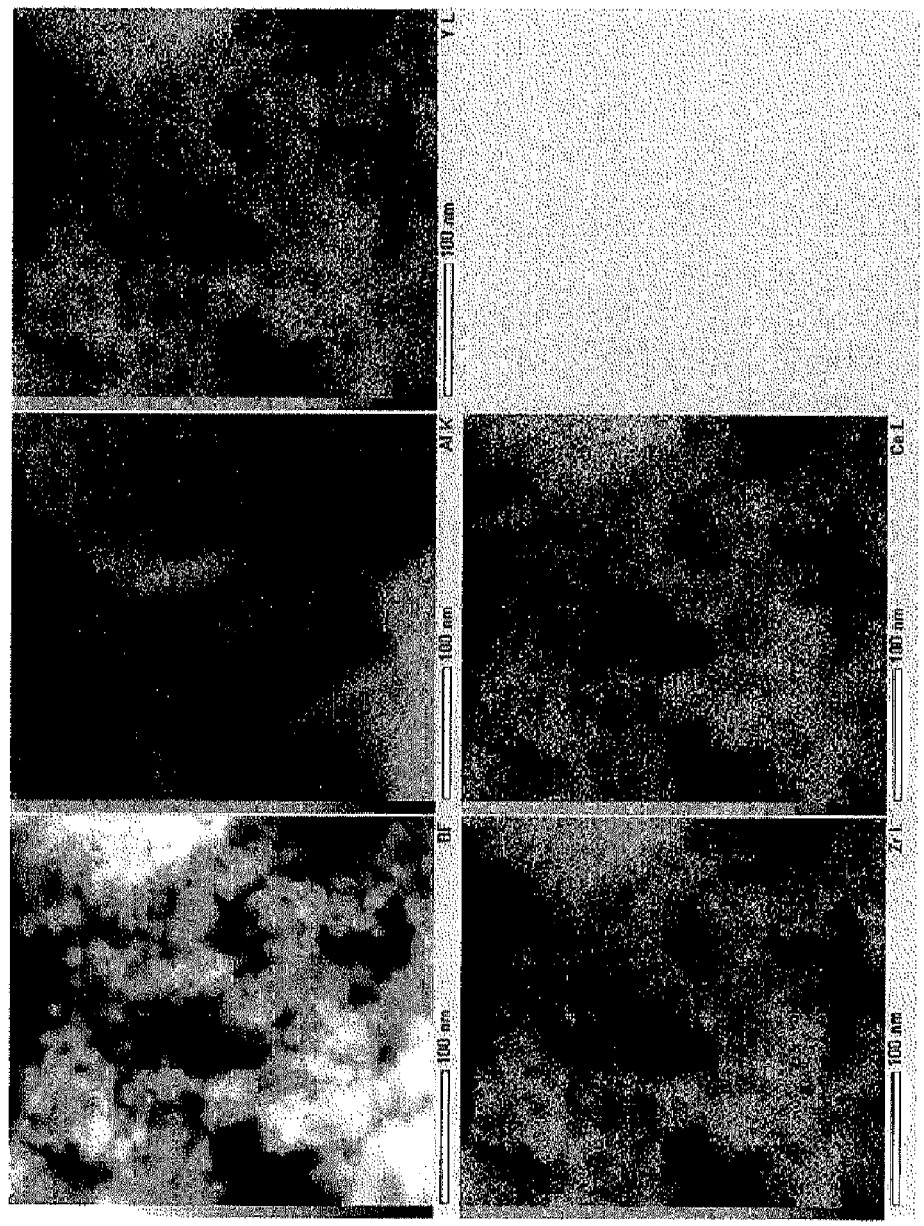
FIG. 13 shows microphotographs showing composition distributions where composition ratios in a porous composite metal oxide obtained in Comparative Example 5 are mapped, respectively.

In addition, average values of data of composition ratios (% by mass) of Al, Ce, Zr, and Y in the obtained porous composite metal oxide and standard deviations thereof with reference to the average values were determined in a similar manner to that in Example 1. Tables 3 and 4 show the obtained results. In addition, FIG. 13 shows composition distributions (HAADF images and EDS mapping images) where composition ratios of Al, Ce, Zr, and Y are mapped, respectively.

Comparative Example 6

PEI, Commercially Available Alumina Sol+CZY Nanocolloid, Nitrates, MN-ACZY

A first sol of a composite metal compound (pH 3.0) and a second sol of composite metal compounds (pH 1.0) were prepared in a similar manner to that in Example 2, except that a commercially available alumina sol (manufactured by NISSAN CHEMICAL INDUSTRIES, LTD., alumina sol-A520) was used in place of the second colloidal solution.

Subsequently, in-liquid average (aggregate) particle diameters of nano particles of the metal compounds in the sole of the composite metal compounds were measured in a similar manner to that in Example 1. Table 1 shows the obtained results.

In addition, by using the obtained sols of the composite metal compounds, the colloidal solution mixing step, the aggregation step, and the heat treatment step were performed in a similar manner to that in Example 1. The obtained porous composite metal oxide was measured for a specific surface area, an average pore diameter, a pore volume, and a crystallite diameter (a primary particle diameter) in a similar manner to that in Example 1. Table 2 shows the obtained results.

Figure 14:
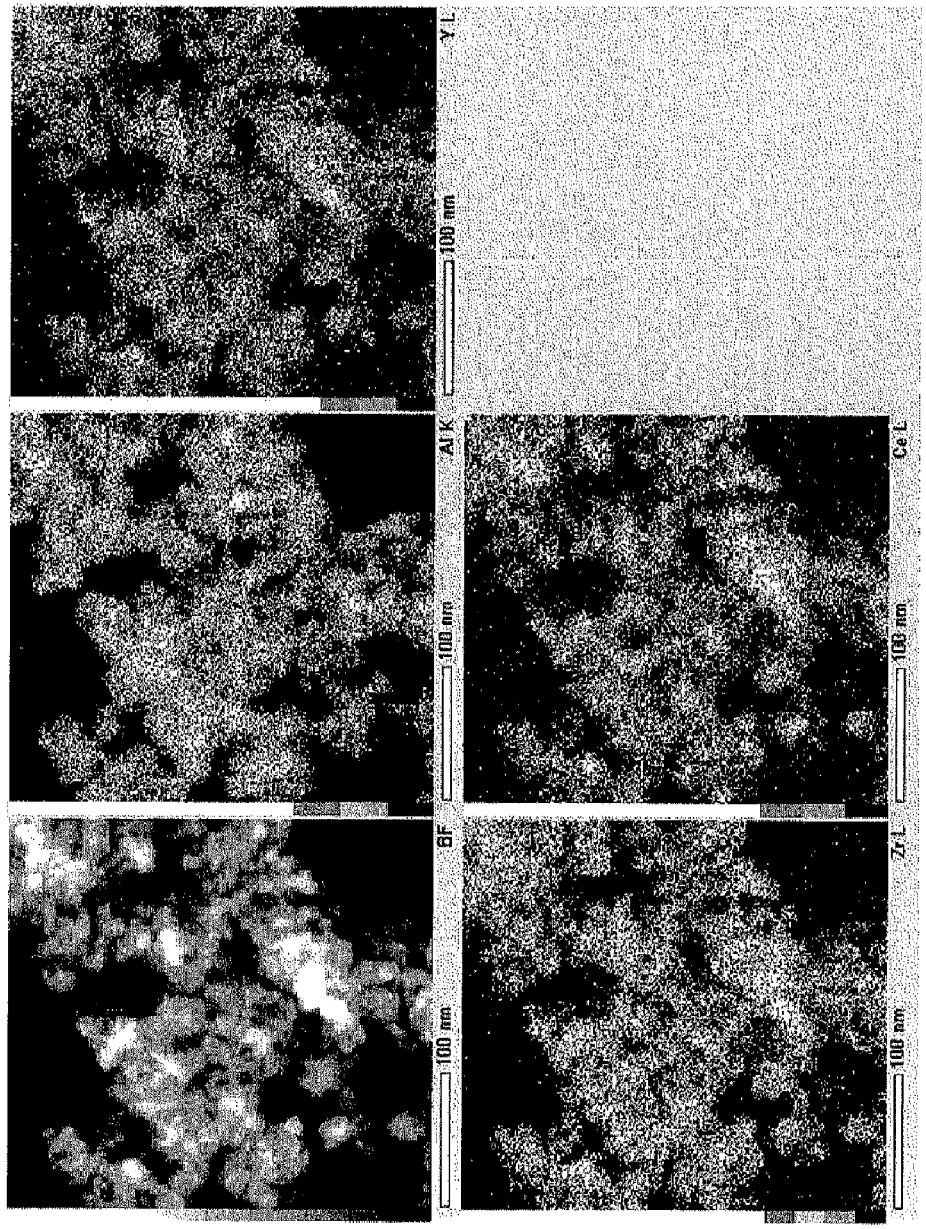
FIG. 14 shows microphotographs showing composition distributions where composition ratios in a porous composite metal oxide obtained in Comparative Example 6 are mapped, respectively.

In addition, average values of data of composition ratios (% by mass) of Al, Ce, Zr, and Y in the obtained porous composite metal oxide and standard deviations thereof with respect to the average values were determined in a similar manner to that in Example 1. Tables 3 and Table 4 show the obtained results. In addition, FIG. 14 shows composition distributions (HAADF images and EDS mapping images) where composition ratios of Al, Ce, Zr, and Y are mapped, respectively.

Moreover, by using the obtained porous composite metal oxide, evaluation of catalytic activities after the durability test was performed in a similar manner to that in Example 1 to determine a T50-CO, a T50-C$_3$H$_6$, and a T50-NO. Table 5 shows the obtained results. In addition, purification ratios of CO, C$_3$H$_6$ and NO at 500° C. were all 100%.

Comparative Example 7

Without PEI, Coprecipitation of All ACZY, Nitrates, JKN-ACZY-Aged

A sol of composite metal compound (pH 11.0) obtained in a similar manner to that in Comparative Example 3 was aged under conditions of 120° C., 2 atoms, and 2 hours.

Subsequently, an in-liquid average (aggregate) particle diameter of particles of metal compound in the sol of the composite metal compound subjected to the aging treatment was measured in a similar manner to that in Example 1. However, it was unable to measure the aggregate particle diameter by the dynamic light scattering method, because the aggregate particle diameter exceeded the upper limit of the measurement with the apparatus. As shown in Table 1, it was found that the aggregation proceeded to such a large extent that the aggregate particle diameter reached several microns or more.

In addition, aggregates in the sol of the composite metal compound subjected to the aging treatment were subjected to a heat treatment in a similar manner to that in Example 1. Thus, a porous composite metal oxide was obtained. The obtained porous composite metal oxide was measured for a specific surface area, an average pore diameter, a pore volume, and a crystallite diameter (a primary particle diameter) in a similar manner to that in Example 1. Table 2 shows the obtained results.

Figure 15:
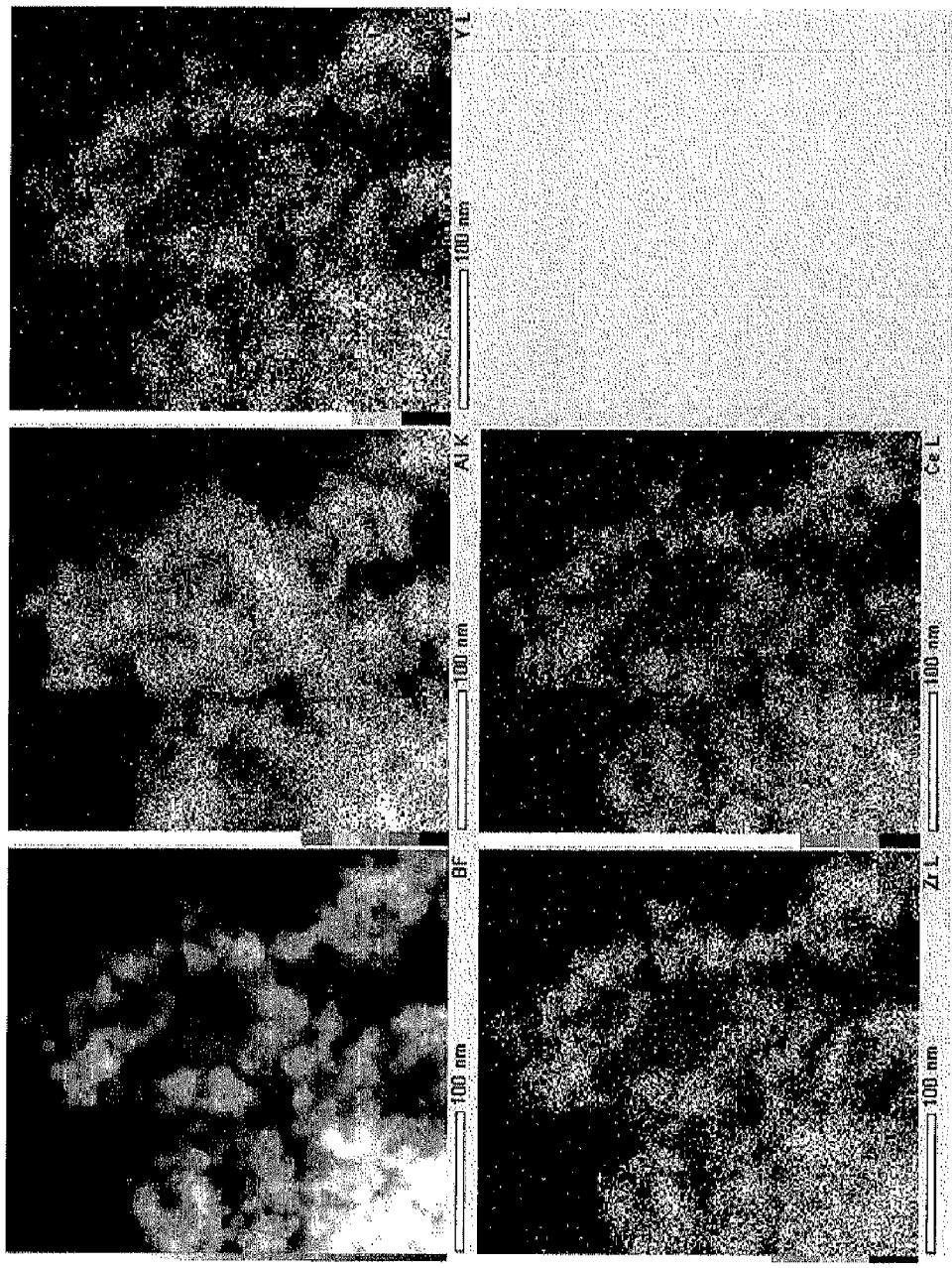
FIG. 15 shows microphotographs showing composition distributions where composition ratios in a porous composite metal oxide obtained in Comparative Example 7 are mapped, respectively.

In addition, average values of data of composition ratios (% by mass) of Al, Ce, Zr, and Y in the obtained porous composite metal oxide and standard deviations thereof with respect to the feed composition were measured in a similar manner to that in Example 1. Tables 3 and 4 show the obtained results. In addition, FIG. 15 shows composition distributions (HAADF images and EDS mapping images) where composition ratios of Al, Ce, Zr, and Y are mapped, respectively.

Moreover, by using the obtained porous composite metal oxide, evaluation of catalytic activities after the durability test was performed in a similar manner to that in Example 1 to determine a T50-CO, a T50-C$_3$H$_6$, and a T50-NO. Table 5 shows the obtained results. In addition, purification ratios of CO, C$_3$H$_6$ and NO at 500° C. were all 100%.

Comparative Example 8

Without PEI, Coprecipitation of All AZL, Nitrates, JKN-AZL-0

A first solution was prepared by dissolving 37.4 g of aluminum nitrate, 16.2 g of zirconium oxynitrate, and 0.54 g of lanthanum nitrate in 500 g of ion-exchanged water. Meanwhile, a second solution was prepared by dissolving 30.8 g of 25% ammonia water in 500 g of ion-exchanged water.

Next, the second solution was poured into a 1-L beaker. Then, the first solution was introduced into the beaker rapidly, and propeller stirring was performed at 300 rpm for 10 minutes. Thus, a sol of a composite metal compound (pH 11.0) was prepared.

Subsequently, an in-liquid average (aggregate) particle diameter of particles of the metal compound in the sol of the composite metal compound was measured in a similar manner to that in Example 1. However, it was unable to measure the aggregate particle diameter by the dynamic light scattering method, because the aggregate particle diameter exceeded the upper limit of the measurement with the apparatus. As shown in Table 1, it was found that the aggregation proceeded to such a large extent that the aggregate particle diameter reached several microns or more.

In addition, aggregates in the obtained sol of the composite metal compound were subjected to a heat treatment in a similar manner to that in Example 1. Thus, a porous composite metal oxide was obtained. The obtained porous composite metal oxide was measured for a specific surface area, an average pore diameter, and a pore volume in a similar manner to that in Example 1. Table 2 shows the obtained results.

Figure 16:
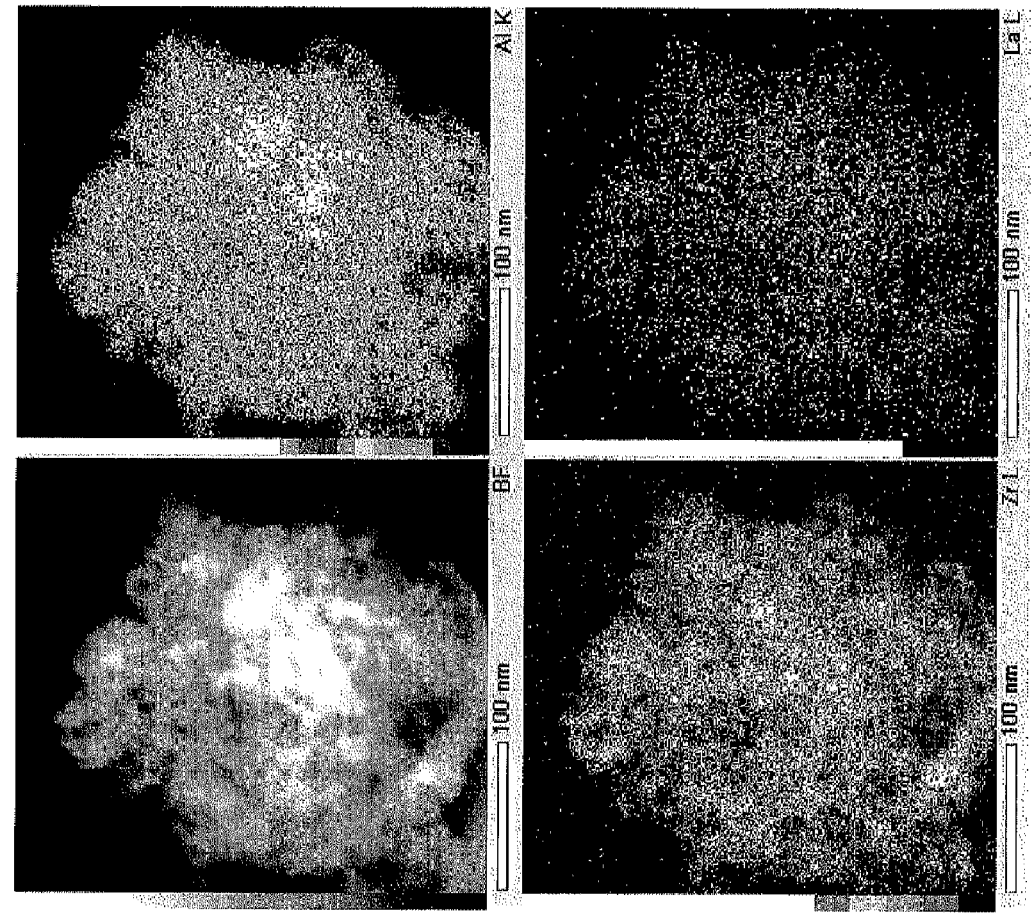
FIG. 16 shows microphotographs showing composition distributions where composition ratios in a porous composite metal oxide obtained in Comparative Example 8 are mapped, respectively.

In addition, average values of data of composition ratios (% by mass) of Al, Zr, and La in the obtained porous composite metal oxide and standard deviations thereof with respect to the feed composition were determined in a similar manner to that in Example 1. Tables 3 and 4 show the obtained results. In addition, FIG. 16 shows composition distributions (HAADF images and EDS mapping images) where composition ratios of Al, Zr, and La are mapped, respectively.

Example 4

PEI, Mixing of AZT Nanocolloid, Chloride/Nitrates, MN-AZT-62.5

First, a raw material solution A-1, a raw material solution B-1, a raw material solution A-2, and a raw material solution B-2 were prepared as follows.

Raw material solution A-1: prepared by dissolving 37.6 g of aluminum nitrate in 500 g of ion-exchanged water.

Raw material solution B-1: prepared by dissolving 31.2 g of ammonium nitrate, 62.5 g of a polyethyleneimine having a molecular weight of 10000, and 115 g of nitric acid in 307 g of ion-exchanged water.

Raw material solution A-2: prepared by dissolving 11.6 g of a hydrochloric acid solution of titanium tetrachloride (containing Ti at 0.345 mol per 100 g) and 16.0 g of zirconyl nitrate dihydrate in 500 g of ion-exchanged water.

Raw material solution B-2: prepared by dissolving 93.4 g of ammonium nitrate, 62.5 g of a polyethyleneimine having a molecular weight of 10000, and 115 g of hydrochloric acid in 307 g of ion-exchanged water.

A first colloidal solution (pH 3.8) and a second colloidal solution (pH 0.7) were prepared in a similar manner to that in Example 1, except that the above-described raw material solutions were each used as the raw material solution A-1, the raw material solution B-1, the raw material solution A-2, and the raw material solution B-2. These added amounts correspond to a cation concentration of 0.1 mol/L, where Ti:Zr=60:40 (molar ratio).

Subsequently, in-liquid average (aggregate) particle diameters of nano particles of metal compounds in the colloidal solutions were measured in a similar manner to that in Example 1. Table 6 shows the obtained results.

Next, a colloidal solution mixture (pH 1.2) was obtained by performing propeller stirring under conditions of 300 rpm and 24 hours in a similar manner to that in Example 1, except that the first colloidal solution and the second colloidal solution were weighed out at a ratio of $ZT:Al_2O_3=50:50$ (mass ratio).

Aggregates were obtained by adjusting the pH of the obtained colloidal solution mixture to 9.5 by a method in which ammonia water was added to the obtained colloidal solution mixture over 10 seconds with stirring. Subsequently, the obtained aggregates were dried by being held in air at 80° C. for 10 hours. Thereafter, the dried aggregates was degreased by being held in air at 350° C. for 5 hours, and then subjected to a heat treatment by further being held in air at 800° C. for 5 hours. Thus, a porous composite metal oxide was obtained.

The obtained porous composite metal oxide was measured for a specific surface area, an average pore diameter, a pore volume, and a crystallite diameter (a primary particle diameter) in a similar manner to that in Example 1. Table 7 shows the obtained results.

Figure 17:
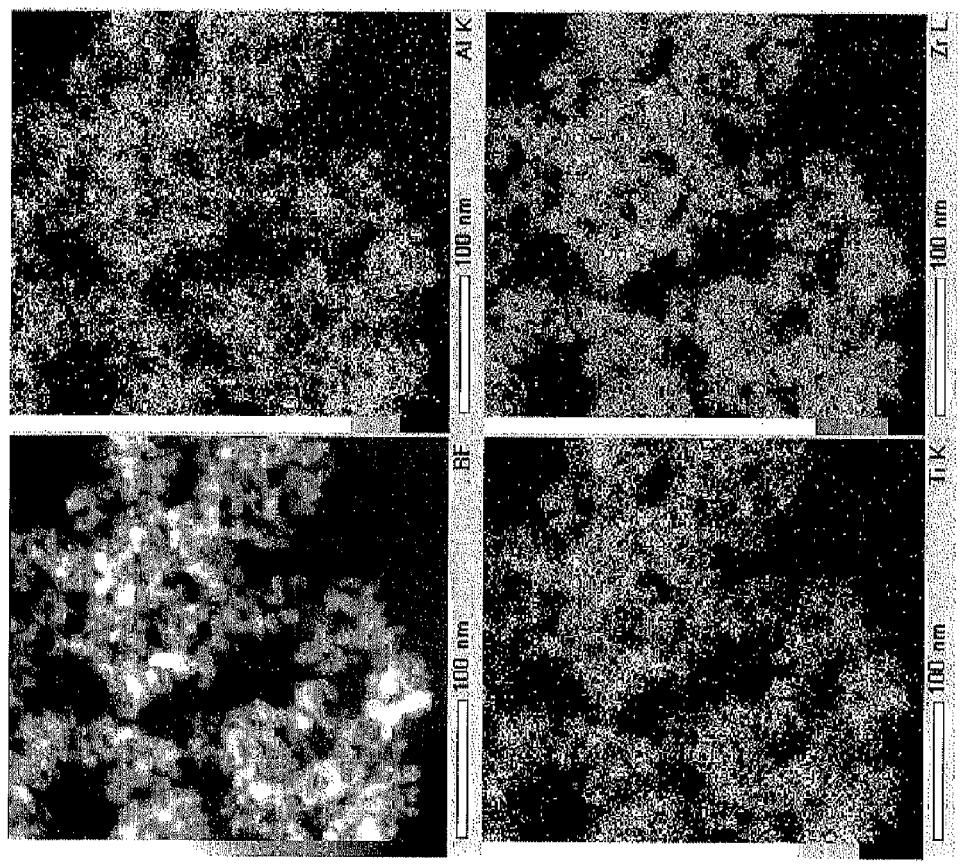
FIG. 17 shows microphotographs showing composition distributions where composition ratios in a porous composite metal oxide obtained in Example 4 are mapped, respectively.

Moreover, average values of data of composition ratios (% by mass) of Al, Zr, and Ti in the obtained porous composite metal oxide and standard deviations thereof were determined in a similar manner to that in Example 1. Tables 8 and Table 9 show the obtained results. In addition, FIG. 17 shows composition distributions (HAADF images and EDS mapping images) where composition ratios of Al, Zr, and Ti are mapped, respectively.

Comparative Example 9

Without PEI, Coprecipitation of All AZT, Chloride/Nitrates, JKN-AZT-0

In 1000 g of ion-exchanged water, 441.2 g of aluminum nitrate was dissolved. To this solution, 42.0 g of zirconium oxynitrate, and 65.4 g of a hydrochloric acid solution of titanium tetrachloride (containing Ti at 0.345 mol per 100 g) were further added. Then, to this mixture, 153.9 g of an aqueous solution of hydrogen peroxide was added. The resultant mixture was stirred by using a homogenizer (manufactured by IKA WORKS, Inc., product name: T25) at 1100 rpm (average shear rate: 2060 $sec^{-1}$) for 1 minute. Subsequently, 400 g of ion-exchanged water was added to this mixture, and then 456 g of 25% ammonia water was added thereto. The mixture was further stirred by using the homogenizer at 1100 rpm (average shear rate: 2060 $sec^{31\ 1}$) for 10 minutes. Thus, a colloidal solution (pH 1.8) was prepared. These added amounts correspond to Ti:Zr=60:40 (molar ratio), and $ZT:Al_2O_3=50:50$ (mass ratio).

Subsequently, an in-liquid average (aggregate) particle diameter of particles of a metal compound in the colloidal solution was measured in a similar manner to that in Example 1. However, it was unable to measure the aggregate particle diameter by the dynamic light scattering method, because the aggregate particle diameter exceeded the upper limit of the measurement with the apparatus. As shown in Table 6, it was found that the aggregation proceeded to such a large extent that the aggregate particle diameter reached several microns or more.

Subsequently, the obtained aggregates were dried by being held in air at 80° C. for 10 hours, degreased by being held in the atmosphere at 400° C. for 5 hours, and then subjected to a heat treatment by being further held in air at 800° C. for 5 hours. Thus, a porous composite metal oxide was obtained.

The obtained porous composite metal oxide was measured for a specific surface area, an average pore diameter, a pore volume, and a crystallite diameter (a primary particle diameter) in a similar manner to that in Example 1. Table 7 shows the obtained results.

Figure 18:
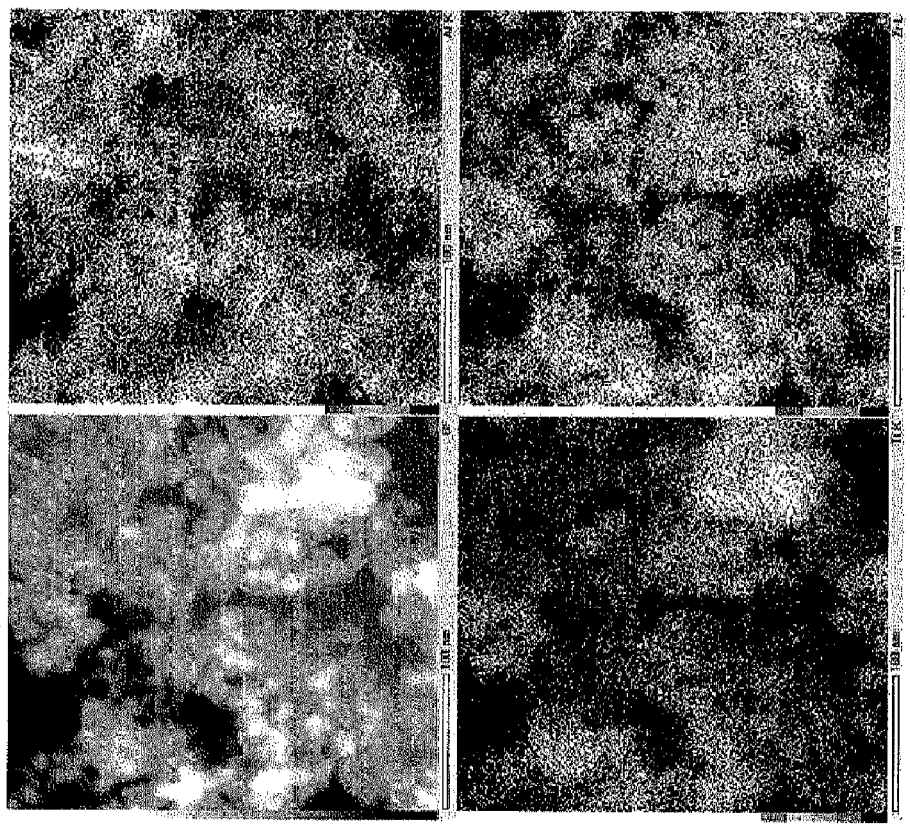
FIG. 18 shows microphotographs showing composition distributions where composition ratios in a porous composite metal oxide obtained in Comparative Example 9 are mapped, respectively.

Moreover, average values of data of composition ratios (% by mass) of Al, Zr, and Ti in the obtained porous composite metal oxide and standard deviations thereof were determined in a similar manner to that in Example 1. Tables 8 and 9 show the obtained results. In addition, FIG. 18 shows composition distributions (HAADF images and EDS mapping images) where composition ratios of Al, Zr, and Ti are mapped, respectively.

Example 5

PEI, Mixing of $Al_2O_3$ Nanocolloid and CZY Nanocolloid, Nitrates, MN-ACZY-62.5

Here, CZY refers to a composite oxide in which zirconium oxide and yttrium oxide are solid-dissolved in cerium oxide. Meanwhile, ACZY refers to a composite metal oxide in which alumina (A) and CZY are uniformly mixed with each other at an extremely high degree of dispersion.

By use of the porous composite metal oxide powder prepared in Example 2 as a catalyst support, a copper-based catalyst was obtained and evaluated as follows.

<Supporting of Copper-Based Active Species>

After 0.97 g of copper nitrate trihydrate was completely dissolved in 100 g of ion-exchanged water, 5 g of the porous composite metal oxide powder prepared in Example 2 was added thereto. Then, the ion-exchanged water was removed by heating the mixture to 100° C. with stirring. Then, calcination was conducted in air at 500° C. for 5 hours. Subsequently, the obtained powder was shaped by using a cold isostatic pressing machine at 1000 kgf/cm$^2$, then ground to have a φ of 0.5 to 1 mm. Thus, a pellet catalyst was obtained. In the pellet catalyst, copper oxide particles were supported on the porous composite metal oxide of the present invention. When the pellet catalyst is exposed to a reducing atmosphere, the copper oxide is partially reduced to form copper particles. As a result, catalytic activities are exhibited.

<Evaluation of Catalytic Activities>

One gram of the catalyst was placed in a normal pressure fixed bed flow type reactor (manufactured by BEST INSTRUMENTS CO., Ltd.), and evaluated for the catalytic activities. Specifically, a model gas made of CO (0.7% by volume), $H_2$ (0.23% by volume), NO (0.12% by volume), $C_3H_6$ (0.16% by volume), $O_2$ (0.64% by volume), $CO_2$ (10% by volume), $H_2O$ (3% by volume), and $N_2$ (the balance) was supplied to the catalyst at a gas flow rate of 7000 mL/min. The temperature of gas entering the catalyst was adjusted to 100° C., and a CO concentration, a $C_2H_6$ concentration, and a NO concentration in the gas entering the catalyst were measured. Thereafter, a pretreatment was performed in which the temperature of the gas entering the catalyst was raised to 600° C. at a rate of temperature rise of 50° C./min, and held for 10 minutes. Subsequently, the gas entering the catalyst was cooled to 100° C. Then, while the temperature of the gas entering the catalyst was again raised to 600° C. at a rate of temperature rise of 15° C./min, a CO concentration, a $C_3H_6$ concentration, and a NO concentration in the gas exiting from the catalyst were measured. The purification ratio of each of CO, $C_3H_6$, and NO was calculated from the difference between the corresponding measured values of the gas entering the catalyst and the gas exiting from the catalyst, and then a T50-CO, a T50-$C_3H_6$, and a T50-NO were determined. Table 10 shows the obtained results.

Comparative Example 10

Without PEI, Coprecipitation of All ACZY, Nitrates, JKN-ACZY-0

A copper-based catalyst was obtained and evaluated in a similar manner to that in Example 5, except that the porous composite metal oxide powder prepared in Comparative Example Comparative Example 3 was used as a catalyst support.

Specifically, a pellet catalyst was prepared in a similar manner to that in Example 5, except that 5 g of the porous composite metal oxide powder prepared in Comparative Example 3 was used, and a T50-CO, a T50-$C_3H_6$, and a T50-NO were determined by conducting evaluation of catalytic activities in a similar manner to that in Example 5. Table 10 shows the obtained results. In addition, at 600° C., the purification ratios of CO and $C_3H_6$ were both approximately 100%, but the purification ratio of NO was as low as approximately 60%.

Example 6

PEI, Mixing of $Al_2O_3$, CZY, and $CuAl_2O_4$ Nanocolloids, Nitrates, MN—CuACZY First, a raw material solution A-1, a raw material solution B-1, a raw material solution A-2, a raw material solution B-2, a raw material solution A-3, and a raw material solution B-3 were prepared as follows.

Raw material solution A-1: prepared by dissolving 10.9 g of diammonium cerium nitrate, 7.6 g of zirconyl oxynitrate, and 1.0 g of yttrium nitrate in 500 g of ion-exchanged water.

Raw material solution B-1: prepared by dissolving 15.0 g of ammonium nitrate, 62.5 g of polyethyleneimine having a molecular weight of 10000, and 115 g of nitric acid in 320 g of ion-exchanged water.

Raw material solution A-2: prepared by dissolving 9.38 g of aluminum nitrate in 500 g of ion-exchanged water.

Raw material solution B-2: prepared by dissolving 8.23 g of ammonium nitrate, 62.5 g of a polyethyleneimine having a molecular weight of 10000, and 115 g of nitric acid in 320 g of ion-exchanged water.

Raw material solution A-3: prepared by dissolving 24.2 g of copper nitrate trihydrate in 500 g of ion-exchanged water.

Raw material solution B-3: prepared by dissolving 19.2 g of ammonium nitrate, 62.5 g of a polyethyleneimine having a molecular weight of 10000, and 115 g of nitric acid in 320 g of ion-exchanged water.

A first colloidal solution (pH 1.0), a second colloidal solution (pH 1.0), and a third colloidal solution (pH 1.0) were prepared in a similar manner to that in Example 1, except that the above-described raw material solutions were used as the raw material solution A-1, the raw material solution B-1, the raw material solution A-2, the raw material solution B-2, the raw material solution A-3, and the raw material solution B-3, respectively. These added amounts correspond to a cation concentration of 0.1 mol/L.

Subsequently, in-liquid average (aggregate) particle diameters of nano particles of the metal compounds in the colloidal solutions were measured in a similar manner to that in Example 1. Table 11 shows the obtained results.

A colloidal solution mixture was obtained by performing the propeller stirring under conditions of 300 rpm and 12 hours in a similar manner to that in Example 1, except that the first colloid, the second colloid, and the third colloid were weighed out in a ratio of Al:Zr:Cu:Ce:Y=55:17:14:12:2 (molar ratio).

Subsequently, by use of the obtained colloidal solution mixture, the aggregation step was performed in a similar manner to that in Example 1. Next, the obtained aggregates were dried by being held in air at 80° C. for 10 hours. Thereafter, the dried aggregates were degreased by being held in air at 400° C. for 1 hour, and then subjected to a heat treatment by further being held in air at 800° C. for 5 hours. Thus, a porous composite metal oxide was obtained. Note that it is known that $Al_2O_3$ reacts with CuO at 800° C. to form $CuAl_2O_4$. If $Al_2O_3$ and CuO completely reacted with each other, the obtained porous composite metal oxide comprised 30.6% by weight of $CuAl_2O_4$, in addition to CZY having a fluorite structure constituted of 16.6% by weight of $Al_2O_3$, 25.2% by weight of $ZrO_2$, 24.9% by weight of $CeO_2$, and 2.7% by weight of $Y_2O_3$. The crystal phase of the obtained porous composite metal oxide powder was identified by XRD. As a result, $CuAl_2O_4$ was detected and CuO was slightly detected, in addition to CZY. However, no peaks of $Al_2O_3$ were detected. This was presumably because $Al_2O_3$ was fine, and no segregation occurred.

The obtained porous composite metal oxide was measured for a specific surface area, an average pore diameter, a pore volume, and a crystallite diameter (a primary particle diameter) of CZY in a similar manner to that in Example 1. Table 12 shows the obtained results.

Figure 19:
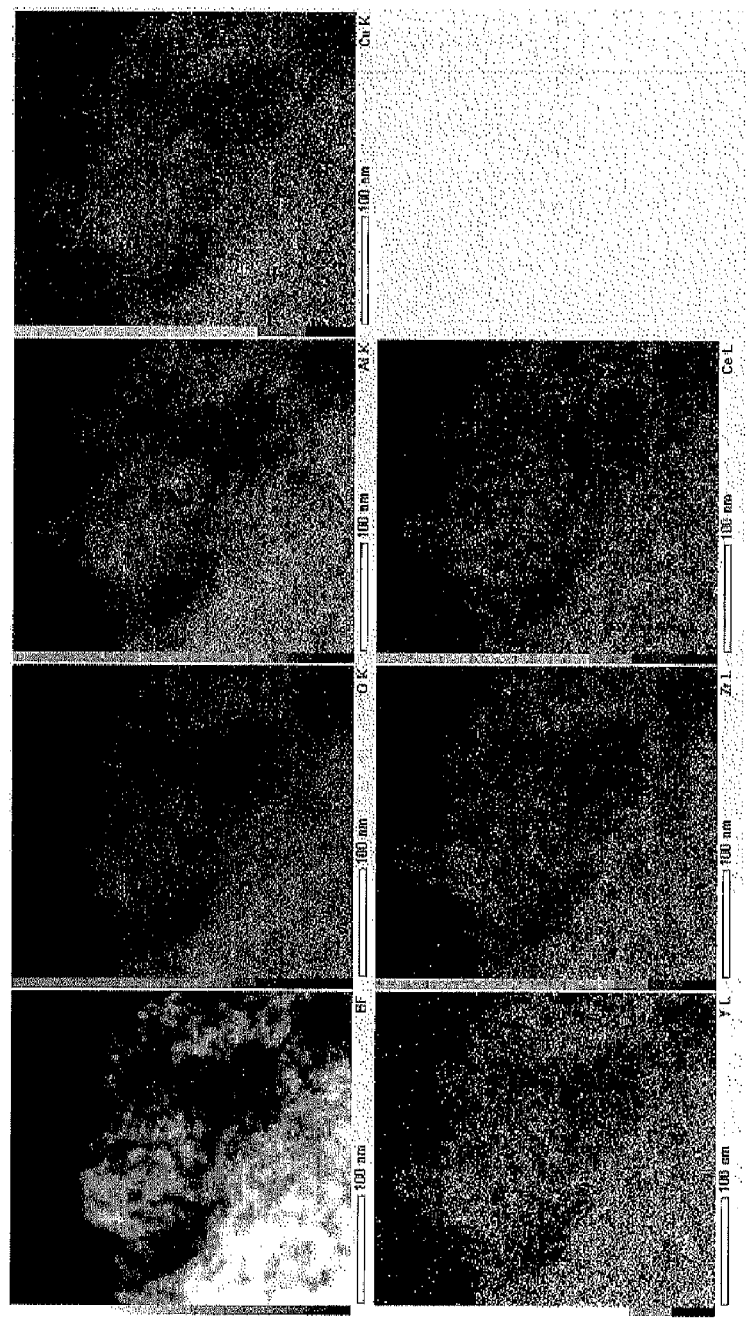
FIG. 19 shows microphotographs showing composition distributions where composition ratios in a porous composite metal oxide obtained in Example 6 are mapped, respectively.

Moreover, average values of data of composition ratios (% by mass) of Al, Ce, Zr, Y, and Cu in the obtained porous composite metal oxide, and standard deviations with respect to the feed composition were determined in a similar manner to that in Example 1. The obtained results are shown in Table 13 (analysis on an area of 20 nm square) and in Table 14 (analysis on an area of 10 nm square). In addition, FIG. 19 shows composition distributions (HAADF images and EDS mapping images) where composition ratios of Al, Ce, Zr, Y, and Cu are mapped, respectively.

Moreover, by using the obtained porous composite metal oxide, evaluation of catalytic activities was performed in a similar manner to that in Example 5 to determine a T50-CO, a T50-$C_3H_6$, and a T50-NO. Table 10 shows the obtained results.

Comparative Example 11

Without PEI, Coprecipitation of All $Al_2O_3$, CZY, and $CuAl_2O_4$, Nitrates, JKN—CuACZY-0

A sol of a composite metal compound (pH 11.0) was prepared by performing the propeller stirring in a similar manner to that in Comparative Example 3, except that a solution obtained by dissolving 6.6 g of ammonium cerium nitrate, 4.5 g of zirconium oxynitrate dihydrate, 0.8 g of yttrium nitrate hexahydrate, 20.6 g of aluminum nitrate nonahydrate, and 3.4 g of copper nitrate trihydrate in 500 g of ion-exchanged water was used as the first solution, and a solution obtained by dissolving 37.6 g of ammonia water having a concentration of 25% in 500 g of ion-exchanged water was used as the second solution.

Subsequently, an in-liquid average (aggregate) particle diameter of particles of the metal compounds in the sol of the composite metal compound was measured in a similar manner to that in Example 1. However, it was unable to measure the aggregate particle diameter by the dynamic light scattering method, because the aggregate particle diameter exceeded the upper limit of the measurement with the apparatus. As shown in Table 11, it was found that the aggregation proceeded to such a large extent that the aggregate particle diameter reached several microns or more.

In addition, a porous composite metal oxide was obtained by subjecting the aggregates in the obtained sol of the composite metal compound to a heat treatment in a similar manner to that in Example 6. The obtained porous composite metal oxide was measured for a specific surface area, an average pore diameter, a pore volume, a crystallite diameter (primary particle diameter) in a similar manner to that in Example 6. Table 12 shows the obtained results.

Figure 20:
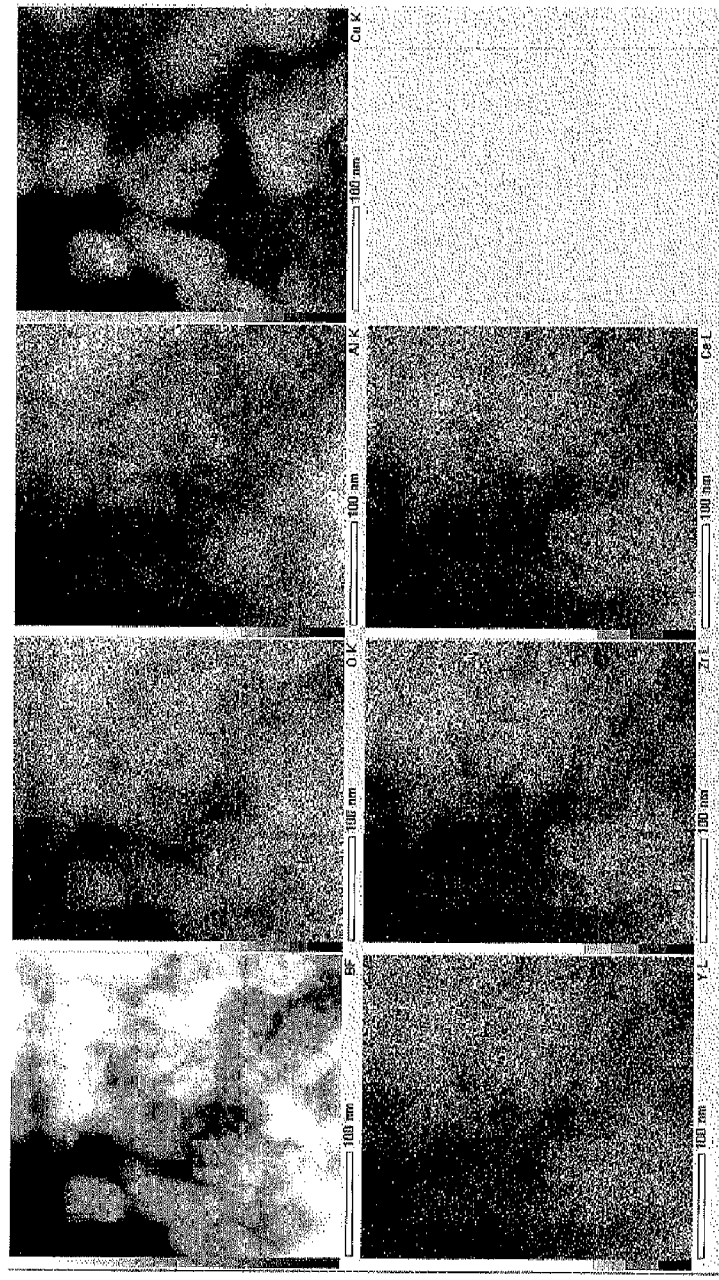
FIG. 20 shows microphotographs showing composition distributions where composition ratios in a porous composite metal oxide obtained in Comparative Example 11 are mapped, respectively.

Moreover, average values of data of composition ratios (by mass) of Al, Ce, Zr, Y, and Cu in the obtained porous composite metal oxide, and standard deviations with respect to the feed composition were determined in a similar manner to that in Example 6. The obtained results are shown in Table 13 (analysis on an area of 20 nm square) and in Table 14 (analysis on an area of 10 nm square). In addition, FIG. 20 shows composition distributions (HAADF images and EDS mapping images) where composition ratios of Al, Ce, Zr, Y, and Cu are mapped, respectively.

Moreover, by using the obtained porous composite metal oxide, evaluation of catalytic activities was performed in a similar manner to that in Example 6 to determine a T50-CO, a T50-$C_3H_6$, and a T50-NO. Table 10 shows the obtained results.

TABLE 1

| ACZY | CZY Raw material salt | Shear rate in synthesis | Type of polymer dispersant and presence or absence of polymer dispersant added | Average (aggregate) particle diameter of particles of composite oxide in nanocolloidal solution or sol (nm) | Remarks |
|---|---|---|---|---|---|
| Example 1 | Acetates | High | PEI, Mw 10000 | $Al_2O_3$ nanocolloid: 1.0 CZY nanocolloid: 1.0 | MS-ACZY-62.5 |
| Comparative Example 1 | Acetates | Low | PEI, Mw 10000 | 18 | JKS-ACZY-62.5 |
| Comparative Example 2 | Acetates | Low | Absent | μm order | JKS-ACZY-0 |
| Example 2 | Nitrates | High | PEI, Mw 10000 | $Al_2O_3$ nanocolloid: 1.0 CZY nanocolloid: 1.0 | MN-ACZY-62.5 |
| Comparative Example 3 | Nitrates | Low | Absent | μm order | JKN-ACZY-0 |
| Comparative Example 4 | Nitrates | High | PEI, Mw 10000 | $Al_2O_3$ nanocolloid: μm order CZY nanocolloid: μm order | MN-ACZY-DpH-62.5 |
| Comparative Example 5 | Nitrates | High | PVP, Mw 24000 | $Al_2O_3$ nanocolloid: μm order CZY nanocolloid: μm order | MN-ACZY-PVP |

TABLE 1-continued

| ACZY | CZY Raw material salt | Shear rate in synthesis | Type of polymer dispersant and presence or absence of polymer dispersant added | Average (aggregate) particle diameter of particles of composite oxide in nanocolloidal solution or sol (nm) | Remarks |
|---|---|---|---|---|---|
| Comparative Example 6 | Nitrates | Low | PEI, Mw 10000 | Commercially available $Al_2O_3$ sol: μm order<br>CZY nanocolloid: 1.0 | MN-ACZY (Commercially available alumina sol + CZY nanocolloid) |
| Comparative Example 7 | Nitrates | Low | Absent | μm order | JKN-ACZY-aged |
| AZL | ZL Raw material salt | | | | |
| Example 3 | Acetates | High | PEI, Mw 10000 | $Al_2O_3$ nanocolloid: 1.0<br>ZL nanocolloid: 1.0 | MS-AZL-62.5 |
| Comparative Example 8 | Nitrates | Low | Absent | μm order | JKN-AZL-0 |

TABLE 2

| | Primary particle diameter (diameter of crystallite), nm | Average pore diameter (nm) | Pore volume (cm³/g) | Specific surface area (m²/g) | Remarks |
|---|---|---|---|---|---|
| ACZY | | | | | |
| Example 1 | 7.0 | 11 | 0.33 | 95 | MS-ACZY-62.5 |
| Comparative Example 1 | 9.0 | 18 | 0.56 | 87 | JKS-ACZY-62.5 |
| Comparative Example 2 | 9.9 | 5 | 0.13 | 40 | JKS-ACZY-0 |
| Example 2 | 6.2 | 13.1 | 0.56 | 87 | MN-ACZY-62.5 |
| Comparative Example 3 | 9.3 | 10 | 0.21 | 64 | JKN-ACZY-0 |
| Comparative Example 4 | 9.5 | 19 | 0.36 | 52 | MN-ACZY-DpH-62.5 |
| Comparative Example 5 | — | 11.2 | 0.23 | 52 | MN-ACZY-PVP |
| Comparative Example 6 | 10.6 | 13.0 | 0.26 | 58 | MN-ACZY (Commercially available alumina sol + CZY nanocolloid) |
| Comparative Example 7 | 11.0 | 6.3 | 0.18 | 90 | JKN-ACZY-aged |
| AZL | | | | | |
| Example 3 | — | 9 | 0.33 | 120 | MS-AZL-62.5 |
| Comparative Example 8 | — | 12 | 0.31 | 96 | JKN-AZL-0 |

TABLE 3

| | Al % by mass | Zr % by mass | Ce % by mass | Y % by mass | La % by mass |
|---|---|---|---|---|---|
| Feed amounts of ACZY | 32.3 | 32.1 | 32.8 | 2.8 | |
| ACZY (acetates) | | | | | |
| Example 1 (MS-ACZY-62.5) | X = 34.6 σ = 4.9 | X = 26.8 σ = 6.6 | X = 33.3 σ = 4.1 | X = 5.3 σ = 4.0 | |
| Comparative Example 1 (JKS-ACZY-62.5) | X = 43.9 σ = 11.5 | X = 31.2 σ = 8.1 | X = 24.5 σ = 12.5 | X = 5.3 σ = 3.0 | |
| Comparative Example 2 (JKS-ACZY-0) | X = 34.4 σ = 6.9 | X = 51.5 σ = 21.3 | X = 13.7 σ = 21.4 | X = 0.4 σ = 2.5 | |
| ACZY (nitrates) | | | | | |
| Example 2 (MN-ACZY-62.5) | X = 27.6 σ = 8.3 | X = 38.2 σ = 8.2 | X = 28.1 σ = 6.5 | X = 5.7 σ = 3.8 | |
| Comparative Example 3 (JKN-ACZY-0) | X = 33.9 σ = 10.8 | X = 37.0 σ = 12.2 | X = 29.1 σ = 8.3 | X = 0.1 σ = 7.5 | |
| Comparative Example 4 (MN-ACZY-DpH-62.5) | X = 12.0 σ = 6.6 | X = 44.2 σ = 15.1 | X = 39.6 σ = 13.3 | X = 4.2 σ = 3.3 | |

TABLE 3-continued

|  | Al % by mass | Zr % by mass | Ce % by mass | Y % by mass | La % by mass |
|---|---|---|---|---|---|
| Comparative Example 5 (MN-ACZY-PVP) | X = 21.4 σ = 24.3 | X = 41.6 σ = 14.2 | X = 31.7 σ = 11.1 | X = 4.8 σ = 3.8 |  |
| Comparative Example 6 (MN-ACZY, N-CZY + Commercially available $Al_2O_3$ sol) | X = 34.2 σ = 17.2 | X = 38.4 σ = 9.2 | X = 21.7 σ = 9.9 | X = 5.7 σ = 4.5 |  |
| Comparative Example 7 (JKN-ACZY-0 + aged) | X = 39.9 σ = 24.7 | X = 30.3 σ = 13.3 | X = 27.3 σ = 13.7 | X = 3.7 σ = 7.2 |  |
| Feed amounts of AZL | 55.4 | 44.5 |  |  | 0.1 |
| AZL (acetates) |  |  |  |  |  |
| Example 3 (MS-AZL-62.5) | X = 52.7 σ = 8.5 | X = 47.2 σ = 8.5 |  |  | X = 1.7 σ = 2.1 |
| AZL (nitrates) |  |  |  |  |  |
| Comparative Example 8 (JKN-AZL-0) | X = 62.6 σ = 17.60 | X = 41.6 σ = 11.3 |  |  | X = 0.2 σ = 0.8 |

TABLE 4

|  | Al % by mass | Zr % by mass | Ce % by mass | Y % by mass | La % by mass |
|---|---|---|---|---|---|
| Feed amounts of ACZY | 32.3 | 32.1 | 32.8 | 2.8 |  |
| ACZY (acetates) |  |  |  |  |  |
| Example 1 (MS-ACZY-62.5) | X = 36.2 σ = 12.0 | X = 27.4 σ = 9.9 | X = 30.5 σ = 10.7 | X = 5.2 σ = 6.2 |  |
| Comparative Example 1 (JKS-ACZY-62.5) | X = 23.7 σ = 20.7 | X = 43.2 σ = 14.6 | X = 25.7 σ = 13.4 | X = 7.3 σ = 7.2 |  |
| Comparative Example 2 (JKS-ACZY-0) | X = 35.8 σ = 9.2 | X = 52.7 σ = 22.5 | X = 8.8 σ = 26.5 | X = 2.8 σ = 4.3 |  |
| ACZY (nitrates) |  |  |  |  |  |
| Example 2 (MN-ACZY-62.5) | X = 29.6 σ = 13.9 | X = 36.7 σ = 10.7 | X = 26.9 σ = 11.5 | X = 6.7 σ = 6.9 |  |
| Comparative Example 3 (JKN-ACZY-0) | X = 44.8 σ = 26.3 | X = 30.6 σ = 12.9 | X = 17.7 σ = 18.5 | X = 6.9 σ = 7.1 |  |
| Comparative Example 4 (MN-ACZY-DpH-62.5) | X = 13.4 σ = 12.4 | X = 47.0 σ = 18.0 | X = 34.9 σ = 18.6 | X = 5.0 σ = 6.3 |  |
| Comparative Example 5 (MN-ACZY-PVP) | X = 27.8 σ = 29.4 | X = 44.6 σ = 20.1 | X = 21.4 σ = 13.9 | X = 7.0 σ = 8.0 |  |
| Comparative Example 6 (MN-ACZY, N-CZY + Commercially available $Al_2O_3$ sol) | X = 47.1 σ = 36.0 | X = 32.6 σ = 24.7 | X = 14.5 σ = 19.3 | X = 5.8 σ = 6.5 |  |
| Comparative Example 7 (JKN-ACZY-0 + aged) | X = 48.1 σ = 37.0 | X = 25.8 σ = 19.4 | X = 23.0 σ = 20.7 | X = 3.1 σ = 4.8 |  |
| Feed amounts of AZL | 55.4 | 44.5 |  |  | 0.1 |
| AZL (acetates) |  |  |  |  |  |
| Example 3 (MS-AZL-62.5) | X = 52.7 σ = 8.04 | X = 47.2 σ = 8.04 |  |  | X = 1.0 σ = 0.32 |
| AZL (nitrates) |  |  |  |  |  |
| Comparative Example 8 (JKN-AZL-0) | X = 62.6 σ = 17.60 | X = 37.2 σ = 17.62 |  |  | X = 0.2 σ = 0.81 |

TABLE 5

| ACZY | NO (° C.) | CO (° C.) | C₃H₆ (° C.) | Remarks |
|---|---|---|---|---|
| Example 1 | 348 | 319 | 344 | MS-ACZY-62.5 |
| Comparative Example 1 | 360 | 330 | 350 | JKS-ACZY-62.5 |
| Comparative Example 2 | 376 | 341 | 369 | JKS-ACZY-0 |
| Example 2 | 322 | 299 | 318 | MN-ACZY-62.5 |
| Comparative Example 3 | 332 | 305 | 326 | JKN-ACZY-0 |
| Comparative Example 4 | 334 | 300 | 323 | MN-ACZY-DpH-62.5 |
| Comparative Example 6 | 330 | 305 | 325 | MN-ACZY (Commercially available alumina sol + CZY nanocolloid) |
| Comparative Example 7 | 331 | 311 | 328 | JKN-ACZY-aged |

TABLE 6

| AZT | T/Z Raw material salt | Shear rate in synthesis | Type of polymer dispersant and presence or absence of polymer dispersant added | Average (aggregate) particle diameter of particles of composite oxide in nanocolloidal solution or sol (nm) | Remarks |
|---|---|---|---|---|---|
| Example 4 | Chloride/nitrates | High | PEI, MW 10000 | ZT nanocolloid: 1.0 Al₂O₃ nano colloid: 1.0 | MN-AZT-62.5 |
| Comparative Example 9 | Chloride/nitrates | Low | Absent | μm order | JKN-AZT-0 |

TABLE 7

| AZT | Primary particle diameter (diameter of crystallite), nm | Average pore diameter (nm) | Pore volume (cm³/g) | Specific surface area (m²/g) | Remarks |
|---|---|---|---|---|---|
| Example 4 | 8.1 | 11 | 0.43 | 145 | MN-AZT-62.5 |
| Comparative Example 9 | 9.4 | 15 | 0.25 | 130 | JKN-AZT-0 |

TABLE 8

| | Al % by mass | Zr % by mass | Ti % by mass | Remarks |
|---|---|---|---|---|
| Feed amounts of AZT | X = 27.5 | X = 53.8 | X = 18.7 | |
| Example 4 | X = 27.0, σ = 5.9 | X = 54.2, σ = 6.0 | X = 18.8, σ = 4.0 | MN-AZT-62.5 |
| Comparative Example 9 | X = 22.7, σ = 20.2 | X = 56.7, σ = 16.5 | X = 20.6, σ = 14.5 | JKN-AZT-0 |

TABLE 9

| | Al % by mass | Zr % by mass | Ti % by mass | Remarks |
|---|---|---|---|---|
| Feed amounts of AZT | X = 27.5 | X = 53.8 | X = 18.7 | |
| Example 4 | X = 27.3, σ = 10.7 | X = 54.0, σ = 7.3 | X = 18.7, σ = 8.9 | MN-AZT-62.5 |
| Comparative Example 9 | X = 25.6, σ = 31.5 | X = 52.4, σ = 25.6 | X = 22.0, σ = 20.5 | JKN-AZT-0 |

TABLE 10

| Cu/ACZY | NO (° C.) | CO (° C.) | $C_3H_6$ (° C.) | Remarks |
|---|---|---|---|---|
| Example 5 | 430 | 246 | 296 | MN-ACZY-62.5 |
| Example 6 | 416 | 227 | 276 | MN-CuACZY-62.5 |
| Comparative Example 10 | 463 | 261 | 312 | JKN-ACZY-0 |
| Comparative Example 11 | 446 | 221 | 290 | JKN-CuACZY-0 |

TABLE 11

| CuACZY | Raw material salt | Shear rate in synthesis | Type of polymer dispersant and presence or absence of polymer dispersant added | Average (aggregate) particle diameter of particles of composite oxide in nanocolloidal solution or sol (nm) | Remarks |
|---|---|---|---|---|---|
| Example 6 | Nitrates | High | PEI, MW 10000 | 1.0 | MN-CuACZY-62.5 |
| Comparative Example 11 | Nitrates | Low | Absent | μm order | JKN-CuACZY-0 |

TABLE 12

| CuACZY | Primary particle diameter (diameter of crystallite), nm | Average pore diameter (nm) | Pore volume ($cm^3/g$) | Specific surface area ($m^2/g$) | Remarks |
|---|---|---|---|---|---|
| Example 6 | 6.5 | 11 | 0.41 | 119 | MN-CuACZY-62.5 |
| Comparative Example 11 | 10.6 | 8 | 0.19 | 65 | JKN-CuACZY-0 |

TABLE 13

| | Al % by mass | Ce % by mass | Zr % by mass | Y % by mass | Cu % by mass | Remarks |
|---|---|---|---|---|---|---|
| Feed amounts of CuACZY | X = 28.6 | X = 27.7 | X = 26.1 | X = 2.7 | X = 14.9 | |
| Example 6 | X = 33.8, σ = 7.5 | X = 32.8, σ = 7.3 | X = 21.6, σ = 8.3 | X = 6.1, σ = 1.5 | X = 6.1, σ = 1.5 | MN-CuACZY-62.5 |
| Comparative Example 11 | X = 45.3, σ = 30.8 | X = 9.1, σ = 25.9 | X = 5.8, σ = 15.8 | X = 5.5, σ = 3.2 | X = 39.5, σ = 42.4 | JKN-CuACZY-0 |

TABLE 14

| | Al % by mass | Ce % by mass | Zr % by mass | Y % by mass | Cu % by mass | Remarks |
|---|---|---|---|---|---|---|
| Feed amounts of CuACZY | X = 28.6 | X = 27.7 | X = 26.1 | X = 2.7 | X = 14.9 | |
| Example 6 | X = 36.6, σ = 14.8 | X = 23.9, σ = 13.4 | X = 25.3, σ = 14.9 | X = 2.5, σ = 1.6 | X = 7.1, σ = 9.2 | MN-CuACZY-62.5 |
| Comparative Example 11 | X = 51.5, σ = 24.8 | X = 4.5, σ = 26.3 | X = 33.0, σ = 20.0 | X = 5.3,= σ = 3.8 | X = 0.3, σ = 14.3 | JKN-CuACZY-0 |

As is apparent from the results of Examples 1 to 4, the production method of the present invention makes it possible to obtain a porous composite metal oxide of the present invention in which highly uniformly disposed metal oxide nano particles of two phases or more are physically mixed with each other. When, for example, the porous composite metal oxide of the present invention is used as a catalyst support, the porous composite metal oxide serves as a support extremely excellent in heat resistance, because $Al_2O_3$ nano particles are disposed finely and uniformly as a diffusion barrier between functional particles (composite oxide nano particles containing zirconia). Moreover, according to the present invention, it is possible to control the pore diameter and the pore volume, hence to prepare a support suitable for the kind of the noble metal, and to prepare a catalyst exhibiting excellent activities even after the durability test.

In addition, as is apparent from the results of Comparative Examples 1, 2, 3, 7, 8, and 9, in each of the cases where the propeller stirring with which a smaller shear rate was provided when nuclei of the crystals of a composite metal compound of two or more phases are formed, the standard deviations of mass percentages of major metal elements in the composite oxide was greater than 10 in the analysis on the area of 20 nm square, and greater than 15 in the analysis on the area of 10 nm square, and the catalytic activities were low.

Meanwhile, as is apparent from the results in Examples 1 to 4, if an appropriate level of shear rate is provided simultaneously with the formation of the nuclei of the crystals of the composite metal compound of two phases, the in-liquid average aggregate particle diameter of each of the formed composite metal compounds was achieved as an extremely small value of the 1-nm level, and uniform arrangement of particles of the crystals of two phases was achieved at the extremely small level. As a result, in each of the porous composite metal oxides after the heat treatment at 1000° C., the standard deviations of mass percentages of the major metal elements were smaller than 10 in the analysis on the area of 20 nm square, and smaller than 15 in the analysis on the area of 10 nm square. In addition, the porous composite metal oxide had excellent catalytic activities.

Note that when the commercially available sol was used (Comparative Example 6), the particles of the composite metal compound in the mixture sol were greatly aggregated, and hence the particles of the crystals of two-phase were not disposed uniformly. As a result, in the porous composite metal oxide after the heat treatment at 1000° C., the standard deviations of mass percentages of the major metal elements were greater than 10 in the analysis on the area of 20 nm square, and greater than 15 in the analysis on the area of 10 nm square. In addition, the porous composite metal oxide had inferior catalytic activities.

In addition, the porous composite metal oxide of the present invention is not obtained by simply applying a high shear rate in the synthesis of the colloids, but the adsorption, under appropriate conditions, of an appropriate polymeric dispersant capable of providing a repulsive force due to steric hindrance to nuclei of the crystals at a level of 1 nm in water is necessary.

When the polyethyleneimine having a molecular weight of 10000 was used as the polymeric dispersant, a high shear rate was applied, and the in-liquid average aggregate particle diameter of the composite metal compound in the formed colloidal solution was as minute as the 1-nm level. Hence, the particles of the crystals of two phases were uniformly disposed. As a result, in each of the porous composite metal oxides after the heat treatment at 1000° C., the standard deviations of mass percentages of the major metal elements were smaller than 10 in the analysis on the area of 20 nm square, and smaller than 15 in the analysis on the area of 10 nm square (Examples 1 to 4). Meanwhile, when the polyvinylpyrrolidone having a molecular weight of 24000 was used (Comparative Example 5), the particles of the composite metal compound in the sol aggregated up to a level of several µ in the liquid, and the particles of crystals of two phases were not disposed uniformly. As a result, in the porous composite metal oxide after the heat treatment at 1000° C., the standard deviations of mass percentages of the major metal elements were greater than 10 in the analysis on the area of 20 nm square, and greater than 15 in the analysis on the area of 10 nm square. Moreover, the pH at the time of the addition of the polyethyleneimine is also important. When the pH was not adjusted appropriately (Comparative Example 4), particles of the composite metal compounds in the sols aggregated up to the several µ level, and particles of crystals of two phases were not disposed uniformly. As a result, in the porous composite metal oxide after the heat treatment at 1000° C., the standard deviations of mass percentages of the major metal elements were greater than 10 in the analysis on the area of 20 nm square, and greater than 15 in the analysis on the area of 10 nm square.

In addition, as is apparent from a comparison between Example 5 and Comparative Example 10, the porous composite metal oxide of the present invention was effective as an excellent catalyst also in a case where a transition metal such as Cu, Fe, Ni, Co, Mn, or Zn, an oxide thereof, or a mixture thereof was used as the active species.

Moreover, as is apparent from a comparison between Example 6 and Comparative Example 11, the porous composite metal oxide of the present invention was effective as an excellent catalyst also in a case where the porous composite metal oxide comprising the mixture of the first ultrafine particles containing alumina and the second ultrafine particles containing zirconia was caused to further contain $CuAl_2O_4$ and CuO, which show excellent catalytic activities, as additional components.

INDUSTRIAL APPLICABILITY

As has been described above, according to the present invention, it is possible to obtain a porous composite metal oxide in which ultrafine particles containing alumina and ultrafine particles containing zirconia are uniformly mixed with each other at an extremely high degree of dispersion. For this reason, according to the present invention, it is possible to provide a porous composite metal oxide containing alumina and zirconia and being excellent in heat resistance. This porous composite metal oxide is useful as a catalyst support with which an ideal catalyst having high levels of catalytic activities and durability thereof at high temperature can be achieved.

REFERENCE SIGNS LIST

10: homogenizer, 11: rotor, 12: outer stator, 13: inner stator, 14: rotary shaft, 15: motor, 16A, 16B: nozzle, 17A, 17B: flow path (supply tube), 20: reaction vessel, A, B: reaction solution, X: axis of rotation, Y: surface perpendicular to axis of rotation X.

The invention claimed is:

1. A porous composite metal oxide, comprising:
  a mixture of first ultrafine particles containing alumina and second ultrafine particles containing zirconia, wherein
    the first ultrafine particles and the second ultrafine particles are uniformly dispersed in such a way as to satisfy
      a condition that standard deviations of content ratios (% by mass) of all metal elements contained in the porous composite metal oxide at 0.1% by mass or more are each 10 or less, the standard deviations being obtained by measuring content ratios of the metal elements within a minute analysis region of 20 nm square with respect to 100separate measurement points by energy dispersive X-ray spectroscopy using a scanning transmission electron microscope equipped with a spherical aberration correction function, and
      a condition that standard deviations of content ratios (% by mass) of all metal elements contained in the porous composite metal oxide at 0.1% by mass or more are each 15 or less, the standard deviations being obtained by measuring content ratios of the metal elements within a minute analysis region of 10 nm square with respect to 100 separate measurement points by energy dispersive X-ray spectroscopy using a scanning transmission electron microscope equipped with a spherical aberration correction function,
    a crystallite diameter determined by an X-ray diffraction method is 1 to 10 nm,
    a specific surface area determined by a BET method is 65 $m^2/g$ or more,
    an average pore diameter determined by a nitrogen adsorption method is 20 nm or less, and
    a pore volume determined by a nitrogen adsorption method is 0.3 $cm^3/g$ or more.

2. The porous composite metal oxide according to claim 1, wherein
  at least one of the first ultrafine particles and the second ultrafine particles further contain at least one metal oxide selected from the group consisting of oxides of rare earth elements and oxides of alkaline earth metals.

3. A catalyst comprising:
  the porous composite metal oxide according to claim 1; and
  a noble metal supported on a surface of the porous composite metal oxide.

4. A catalyst comprising:
the porous composite metal oxide according to claim 1; and
a member selected from the group consisting of transition metals, oxides thereof, and mixtures thereof supported on a surface of the porous composite metal oxide, the transition metal being selected from the group consisting of Cu, Fe, Ni, Co, Mn, and Zn.

5. A catalyst comprising:
the porous composite metal oxide according to claim 1; and
$CuAl_2O_4$ and CuO contained in at least one of the first ultrafine particles and the second ultrafine particles.

6. A method for producing a porous composite metal oxide, comprising the steps of:
introducing independently a raw material solution containing aluminum ions and a raw material solution containing at least one polymeric dispersant selected from the group consisting of polyalkyleneimines and (meth) acrylic acid-based polymers directly into a region in which a shear rate is 1000 to 200000 $sec^{-1}$, and homogeneously mixing the raw material solutions, thereby obtaining a first colloidal solution;
introducing independently a raw material solution containing zirconium ions and a raw material solution containing at least one polymeric dispersant selected from the group consisting of polyalkyleneimines and (meth) acrylic acid-based polymers directly into a region in which a shear rate is 1000 to 200000 $sec^{-1}$, and homogeneously mixing the raw material solutions, thereby obtaining a second colloidal solution;
mixing the first colloidal solution and the second colloidal solution with each other under a pH condition under which both the first and second colloidal solutions can maintain a state of being dispersed in a liquid, thereby obtaining a colloidal mixture liquid;
adjusting a pH of the colloidal mixture liquid to a pH condition under which the colloidal mixture liquid cannot maintain a state of being dispersed in the liquid, thereby obtaining an aggregate; and
subjecting the aggregate to a heat treatment, thereby obtaining the porous composite metal oxide according to claim 1.

7. The method for producing a porous composite metal oxide according to claim 6, wherein
at least one of the raw material solution containing aluminum ions and the raw material solution containing zirconium ions further contains ions of at least one metal selected from the group consisting of rare earth elements and alkaline earth metals.

8. The method for producing a porous composite metal oxide according to claim 6, wherein
each of the polymeric dispersants is at least one polyalkyleneimine,
the pH condition under which both the first and second colloidal solutions can maintain the state of being dispersed in the liquid is 0.5 to 5.5, and
the pH condition under which the colloidal mixture liquid cannot maintain the state of being dispersed in the liquid is 9.0 to 12.0.

9. The method for producing a porous composite metal oxide according to claim 6, wherein
each of the polymeric dispersants is at least one (meth) acrylic acid-based polymer,
the pH condition under which both the first and second colloidal solutions can maintain the state of being dispersed in the liquid is 5.0 to 10.0, and
the pH condition under which the colloidal mixture liquid cannot maintain the state of being dispersed in the liquid is 0.5 to 4.0.

10. A method for producing a catalyst, comprising the step of:
supporting a noble metal on a surface of a porous composite metal oxide obtained by the production method according to claim 6.

11. A method for producing a catalyst, comprising the step of:
supporting at least one selected from the group consisting of transition metals, oxides thereof, and mixtures thereof on a surface of a porous composite metal oxide obtained by the production method according to claim 6, the transition metal being selected from the group consisting of Cu, Fe, Ni, Co, Mn, and Zn.

12. A method for producing a catalyst, comprising the step of:
causing the porous composite metal oxide comprising the mixture of the first ultrafine particles containing alumina and the second ultrafine particles containing zirconia to further contain $CuAl_2O_4$ and CuO as additional components, in the production method according to claim 6.

13. The porous composite metal oxide according to claim 1, wherein the porous composite metal oxide is obtained by a method comprising:
introducing independently a raw material solution containing aluminum ions and a raw material solution containing at least one polymeric dispersant selected from the group consisting of polyalkyleneimines and (meth) acrylic acid-based polymers directly into a region in which a shear rate is 1000 to 200000 $sec^{-1}$, and homogeneously mixing the raw material solutions, thereby obtaining a first colloidal solution;
introducing independently a raw material solution containing zirconium ions and a raw material solution containing at least one polymeric dispersant selected from the group consisting of polyalkyleneimines and (meth) acrylic acid-based polymers directly into a region in which a shear rate is 1000 to 200000 $sec^{-1}$, and homogeneously mixing the raw material solutions, thereby obtaining a second colloidal solution; and
mixing the first colloidal solution and the second colloidal solution with each other under a pH condition under which both the first and second colloidal solutions can maintain a state of being dispersed in a liquid, thereby obtaining a colloidal mixture liquid.

14. The porous composite metal oxide according to claim 13, wherein
the method by which the porous composite metal oxide is prepared further comprises adjusting a pH of the colloidal mixture liquid to a pH condition under which the colloidal mixture liquid cannot maintain a state of being dispersed in the liquid, thereby obtaining an aggregate.

15. The porous composite metal oxide according to claim 14, wherein
the pH condition under which both the first and second colloidal solutions can maintain the state of being dispersed in the liquid is 0.5 to 5.5, and
the pH condition under which the colloidal mixture liquid cannot maintain the state of being dispersed in the liquid is 9.0 to 12.0.

16. The porous composite metal oxide according to claim 14, wherein the pH condition under which both the first and second colloidal solutions can maintain the state of being dispersed in the liquid is 5.0 to 10.0, and the pH condition under which the colloidal mixture liquid cannot maintain the state of being dispersed in the liquid is 0.5 to 4.0.

17. The porous composite metal oxide according to claim 1, wherein the porous composite metal oxide is prepared by a method comprising:

introducing independently a raw material solution containing aluminum ions and a raw material solution containing at least one polymeric dispersant selected from the group consisting of polyalkyleneimines and (meth) acrylic acid-based polymers directly into a region in which a shear rate is 1000 to 200000 sec$^{-1}$, and homogeneously mixing the raw material solutions, thereby obtaining a first colloidal solution;

introducing independently a raw material solution containing zirconium ions and a raw material solution containing at least one polymeric dispersant selected from the group consisting of polyalkyleneimines and (meth) acrylic acid-based polymers directly into a region in which a shear rate is 1000 to 200000 sec$^{-1}$, and homogeneously mixing the raw material solutions, thereby obtaining a second colloidal solution;

mixing the first colloidal solution and the second colloidal solution with each other under a pH condition under which both the first and second colloidal solutions can maintain a state of being dispersed in a liquid, thereby obtaining a colloidal mixture liquid;

adjusting a pH of the colloidal mixture liquid to a pH condition under which the colloidal mixture liquid cannot maintain a state of being dispersed in the liquid, thereby obtaining an aggregate; and subjecting the aggregate to a heat treatment, thereby obtaining the porous composite metal oxide.

18. The porous composite metal oxide according to claim 17, wherein each of the polymeric dispersants is at least one polyalkyleneimine, the pH condition under which both the first and second colloidal solutions can maintain the state of being dispersed in the liquid is 0.5 to 5.5, and the pH condition under which the colloidal mixture liquid cannot maintain the state of being dispersed in the liquid is 9.0 to 12.0.

19. The porous composite metal oxide according to claim 17, wherein each of the polymeric dispersants is at least one (meth) acrylic acid-based polymer, the pH condition under which both the first and second colloidal solutions can maintain the state of being dispersed in the liquid is 5.0 to 10.0, and the pH condition under which the colloidal mixture liquid cannot maintain the state of being dispersed in the liquid is 0.5 to 4.0.

* * * * *